United States Patent
Akl et al.

(10) Patent No.: US 12,120,026 B2
(45) Date of Patent: Oct. 15, 2024

(54) QOS MAPPING CONFIGURATION OF AN INTEGRATED ACCESS AND BACKHAUL NETWORK NODE

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Basking Ridge, NJ (US); Jianghong Luo, Skillman, NJ (US); Luca Blessent, Whitehouse Station, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 412 days.

(21) Appl. No.: 17/451,804

(22) Filed: Oct. 21, 2021

(65) Prior Publication Data

US 2022/0132391 A1 Apr. 28, 2022

Related U.S. Application Data

(60) Provisional application No. 63/104,427, filed on Oct. 22, 2020.

(51) Int. Cl.
*H04L 12/28* (2006.01)
*H04L 45/74* (2022.01)
(Continued)

(52) U.S. Cl.
CPC .......... *H04L 45/74* (2013.01); *H04L 47/2441* (2013.01); *H04W 28/0268* (2013.01);
(Continued)

(58) Field of Classification Search
CPC .............. H04L 47/2441; H04W 28/02; H04W 28/0268; H04W 40/22; H04W 40/24
See application file for complete search history.

(56) References Cited

U.S. PATENT DOCUMENTS

2011/0242978 A1* 10/2011 Klein .................. H04L 47/2408
370/235
2019/0349834 A1* 11/2019 Teyeb ................... H04W 84/18
(Continued)

OTHER PUBLICATIONS

3GPP TR 38.874: "3rd Generation Partnership Project, Technical Specification Group Radio Access Network, Study on Integrated Access and Backhaul (Release 15)", Draft, TR 38.874 V0.7.0—Final—CLN, 3rd Generation Partnership Project (3GPP), Mobile Competence Centre, 650, Route Des Lucioles, F-06921, Sophia-Antipolis Cedex, France, Nov. 28, 2018 (Nov. 28, 2018), pp. 1-111, URL: http://www.3gpp.org/ftp/Email%5FDiscussions/RAN2/[RAN2%23104]/[104%2326][IAB]%20TR%2038%2E874/TR%2038874%20v070%20%2D%20final%20%2Dcln%2Ezip.
(Continued)

*Primary Examiner* — Elisabeth Benoit Magloire
(74) *Attorney, Agent, or Firm* — Procopio, Cory, Hargreaves & Savitch

(57) ABSTRACT

In an integrated access backhaul (IAB) network, a third network node sends quality of service (QOS) mapping information to a first network node to configure an internet protocol (IP) header for a packet based on a traffic type and to transmit the packet. The third network node sends a mapping configuration to a second network node to map information in the IP header for the packet received in a first routing path from the first network node to a second routing path. The first network node receives the QoS mapping information and generates a packet associated with the traffic type and including an IP header, which is configured based on the received QoS mapping information. The first
(Continued)

network node transmits the packet for routing to the second network node.

30 Claims, 16 Drawing Sheets

(51) Int. Cl.
  *H04L 47/2441* (2022.01)
  *H04W 28/02* (2009.01)
  *H04W 40/12* (2009.01)
  *H04W 40/22* (2009.01)
  *H04W 40/24* (2009.01)

(52) U.S. Cl.
  CPC ........... *H04W 40/12* (2013.01); *H04W 40/22* (2013.01); *H04W 40/24* (2013.01)

(56) References Cited

U.S. PATENT DOCUMENTS

| | | | | |
|---|---|---|---|---|
| 2020/0146109 | A1* | 5/2020 | Majmundar | H04W 92/14 |
| 2021/0051512 | A1* | 2/2021 | Hampel | H04W 80/06 |
| 2021/0099385 | A1* | 4/2021 | Huang | H04B 7/15528 |
| 2021/0105698 | A1* | 4/2021 | Jactat | H04L 45/302 |
| 2021/0127319 | A1* | 4/2021 | Huang | H04W 8/08 |
| 2021/0259051 | A1* | 8/2021 | Latheef | H04W 24/02 |
| 2021/0282050 | A1* | 9/2021 | Adjakple | H04L 1/1874 |
| 2022/0131798 | A1 | 4/2022 | Akl et al. | |
| 2022/0166703 | A1 | 5/2022 | Xu et al. | |
| 2022/0182917 | A1* | 6/2022 | Muhammad | H04W 40/248 |
| 2022/0225129 | A1 | 7/2022 | Chen et al. | |
| 2022/0225207 | A1 | 7/2022 | Malkamäki et al. | |
| 2022/0272564 | A1 | 8/2022 | Teyeb et al. | |
| 2022/0286841 | A1 | 9/2022 | Mildh | |
| 2022/0286938 | A1 | 9/2022 | Wang et al. | |
| 2022/0295335 | A1* | 9/2022 | Tesanovic | H04W 76/11 |
| 2023/0007732 | A1* | 1/2023 | Zhang | H04W 76/15 |
| 2023/0072379 | A1* | 3/2023 | Cheng | H04L 67/61 |
| 2023/0239757 | A1 | 7/2023 | Huang et al. | |
| 2023/0269644 | A1 | 8/2023 | Teyeb et al. | |
| 2023/0362745 | A1 | 11/2023 | Huang et al. | |
| 2023/0379792 | A1 | 11/2023 | Muhammad et al. | |

OTHER PUBLICATIONS

International Search Report and Written Opinion—PCT/US2021/056254—ISA/EPO—Feb. 3, 2022.

Qualcomm Incorporated: "IAB BAP Bearer Mapping", 3GPP TSG-RAN WG2 Meeting #106, Draft, R2-1906417 IAB BAP Bearer Mapping, 3rd Generation Partnership Project (3GPP), Mobile Competence Centre, 650, Route Des Lucioles, F-06921 Sophia-Antipolis Cedex, France, vol. RAN WG2, No. Reno, NV, USA, May 13, 2019-May 17, 2019, 3 Pages, May 13, 2019 (May 13, 2019), XP051729882, Retrieved from the Internet: URL: http://www.3gpp.org/ftp/Meetings%5F3GPP%5FSYNC/RAN2/Docs/R2%2D1906417%2Ezip [retrieved on May 13, 2019] the whole document.

Qualcomm (Rapporteur): "Email Discussion [108#51][IAB]: BAP Functional View", 3GPP Draft, 3GPP TSG-RAN WG2 Meeting #109-e, R2-2000481, 3rd Generation Partnership Project (3GPP), Mobile Competence Centre, 650, Route Des Lucioles, F-06921 Sophia-Antipolis Cedex, France, vol. RAN WG2, No. Electronic meeting, Feb. 24, 2020-Mar. 6, 2020 Feb. 13, 2020 (Feb. 13, 2020), pp. 1-7, XP051848556, Retrieved from the Internet: URL: https://ftp.3gpp.org/tsg_ran/WG2_RL2/TSGR2_109_e/Docs/R2-2000481.Zip [Retrieved on Feb. 13, 2020] the whole Document.

Qualcomm Incorporated: "Implications of RAN3 Agreements on IP Address Management for RRC Signaling and BAP Functionality", 3GPP Draft, R2-2004749, 3rd Generation Partnership Project (3GPP), Mobile Competence Centre, 650, Route Des Lucioles, F-06921 Sophia-Antipolis Cedex, France, vol. RAN WG2, No. Online, Jun. 1, 2020-Jun. 12, 2020, May 21, 2020 (May 21, 2020), 5 Pages, XP051887451, Retrieved from the Internet: URL: https://www.3gpp.org/ftp/TSG_RAN/WG2_RL2/TSGR2_110-e/Docs/R2-2004749.zip, [retrieved on May 21, 2020], the whole document.

Teyeb O., et al., "Integrated Access Backhauled Networks", 2019 IEEE 90th Vehicular Technology Conference (VTC2019-Fall), Honolulu, HI, USA, 2019, 5 Pages.

* cited by examiner

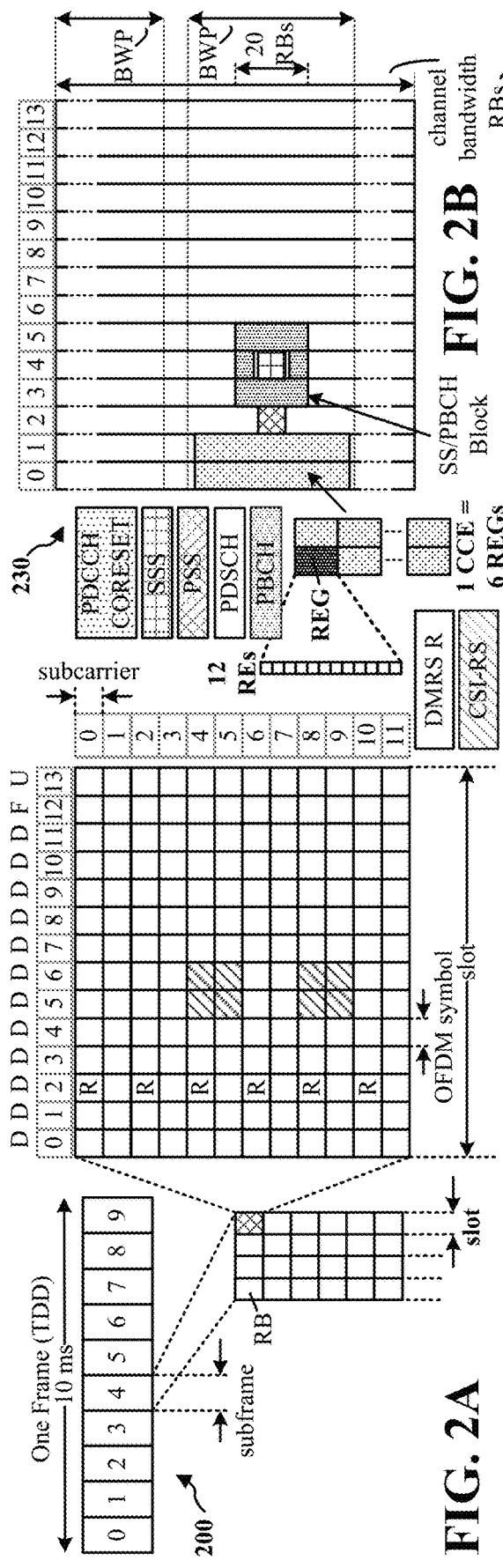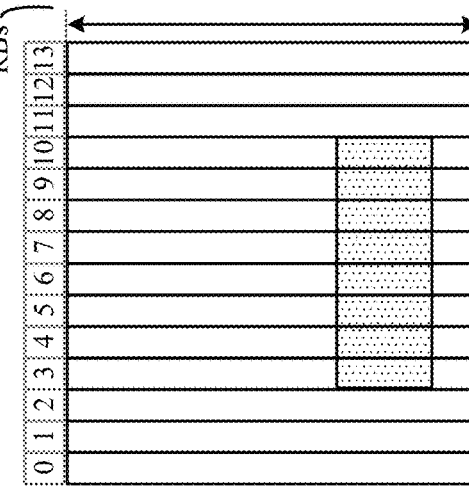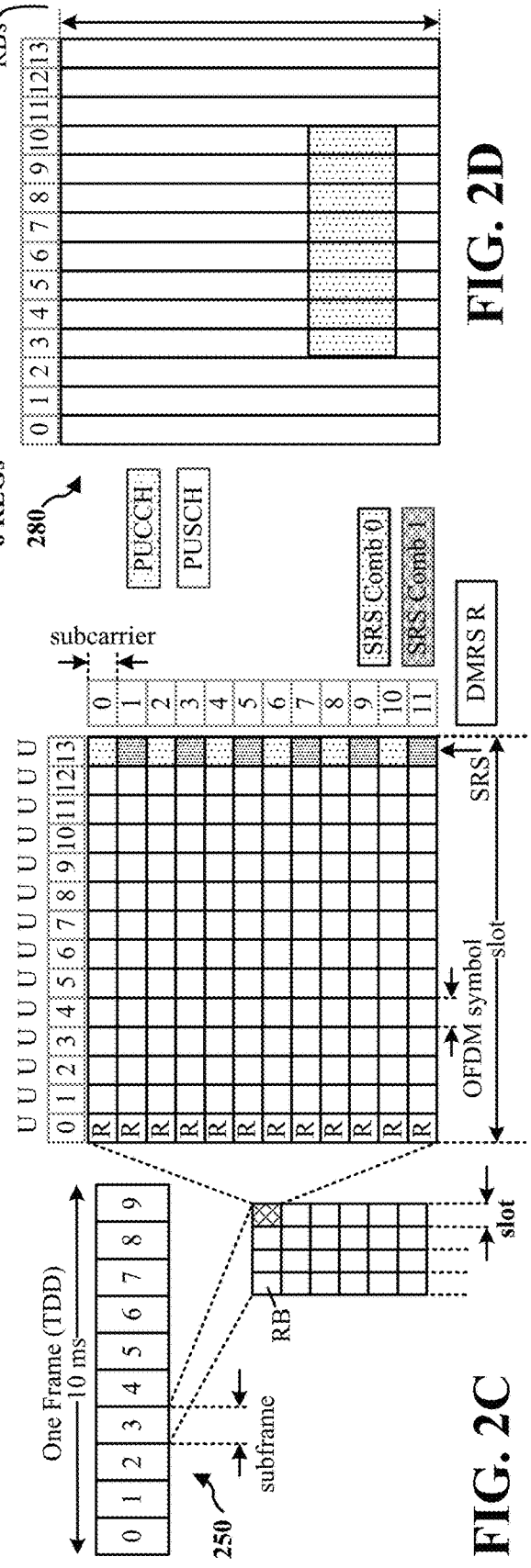
FIG. 2A  FIG. 2B  FIG. 2C  FIG. 2D

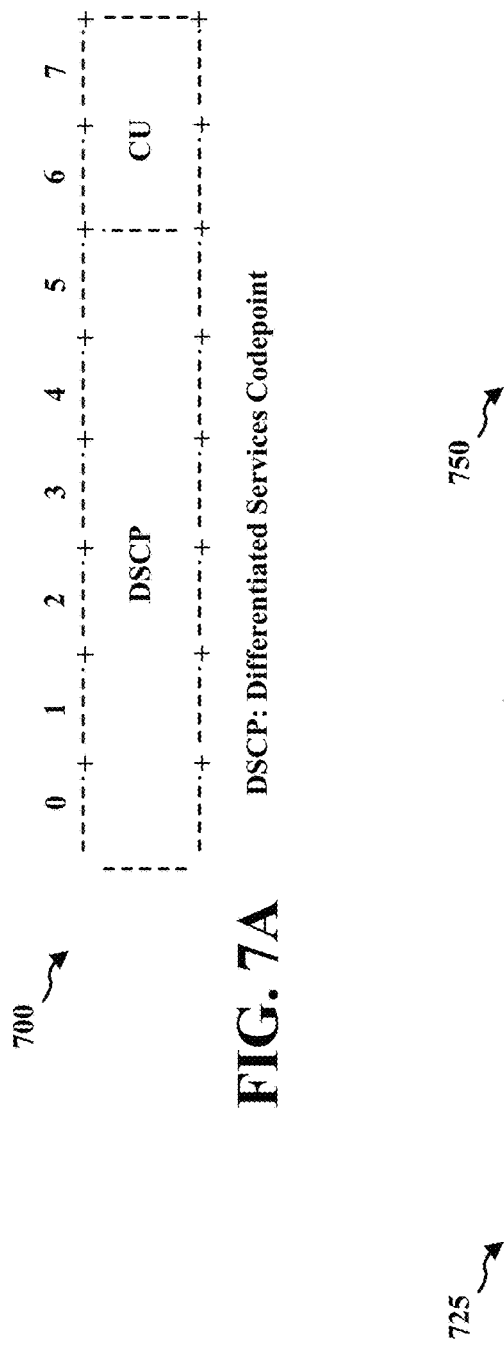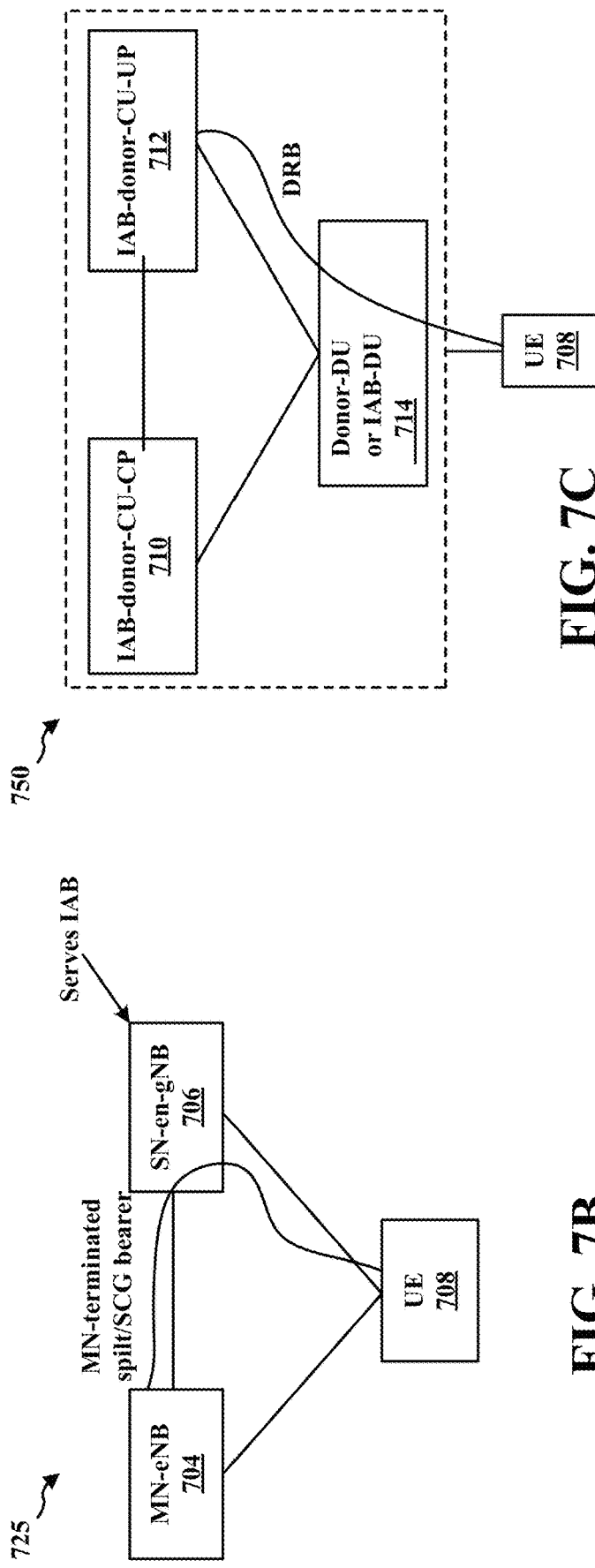
FIG. 7A
FIG. 7B
FIG. 7C

QOS MAPPING CONFIGURATION OF AN INTEGRATED ACCESS AND BACKHAUL NETWORK NODE

CROSS REFERENCE TO RELATED APPLICATION(S)

This application claims the benefit of and priority to U.S. Provisional Application Ser. No. 63/104,427, entitled "IP-Based Routing Support in IAB" and filed on Oct. 22, 2020, which is expressly incorporated by reference herein in its entirety.

TECHNICAL FIELD

The present disclosure relates generally to communication systems, and more particularly, to wireless communication in an integrated access and backhaul (IAB) network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus for wireless communication at a third network node is configured to send quality of service (QoS) mapping information to a first network node to configure an Internet protocol (IP) header for a packet based on a traffic type and to transmit the packet. The apparatus is further configured to send a mapping configuration to a second network node to map information in the IP header for the packet received in a first routing path from the first network node to a second routing path.

In another aspect of the disclosure, a method, a computer-readable medium, and an apparatus are provided. The apparatus for wireless communication at a first network node is configured to receive QoS mapping information from a third network node to configure an IP header for a packet based on a traffic type and to transmit the packet. The apparatus is further configured to generate a packet associated with the traffic type and including an IP header. The IP header is configured based on the received QoS mapping information. The apparatus is further configured to transmit the packet for routing to a second network node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

FIG. 7A illustrates an example of header information for differentiated service, in accordance with various aspects of the present disclosure.

FIG. 7B illustrates an example of a UE having a connection with a primary node and a secondary node, in accordance with various aspects of the present disclosure.

FIG. 7C illustrates example components and an IAB donor node, in accordance with various aspects of the present disclosure.

DETAILED DESCRIPTION

Figure 1:
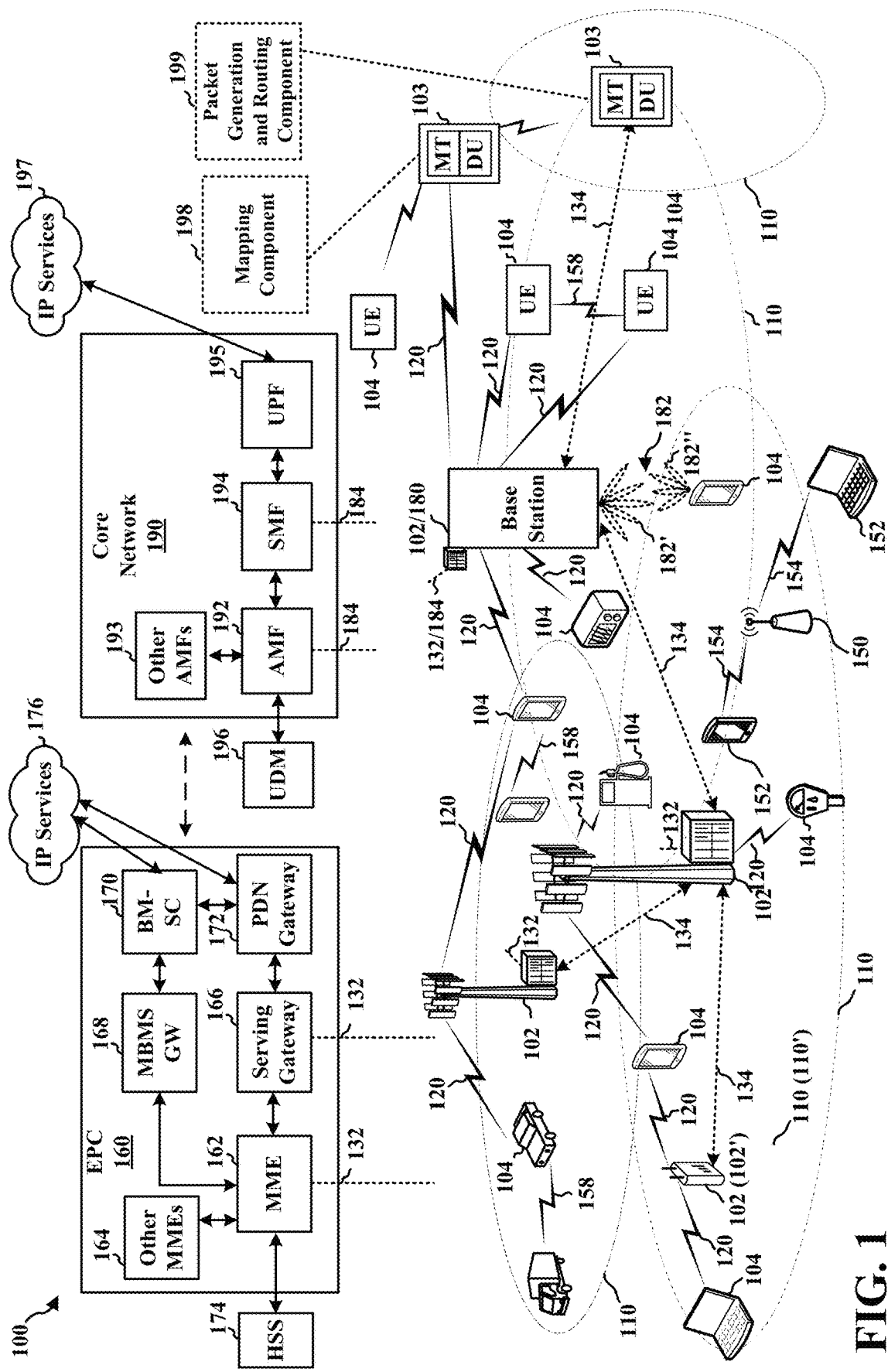
FIG. 1 is a diagram illustrating an example of a wireless communications system and an access network, in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations 180, such as a gNB may operate in a traditional sub 6 GHz spectrum, in millimeter wave frequencies, and/or near millimeter wave frequencies in communication with the UE 104. When the gNB, e.g., base station 180, operates in millimeter wave or near millimeter wave frequencies, the 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, a BS 102/180 (e.g., an IAB node 103) may include a mapping component 198 configured to send QoS mapping information to a first network node (e.g., as an IAB node in an IAB network) to configure an IP header for a packet based on a traffic type, and to transmit the packet. The mapping component 198 may also be configured to send a mapping configuration to a second network node (e.g., as a second IAB node in an IAB network) to map information in the IP header for the packet received in a first routing path from the first BS to a second routing path.

The base station 102/180 or an IAB node 103 in an IAB network may include a packet generation and routing component 199 configured to generate a packet associated with the traffic type and including an IP header, which is configured based on the received QoS mapping information. The packet generation and routing component 199 may also be configured to transmit the packet for routing to the second network node. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
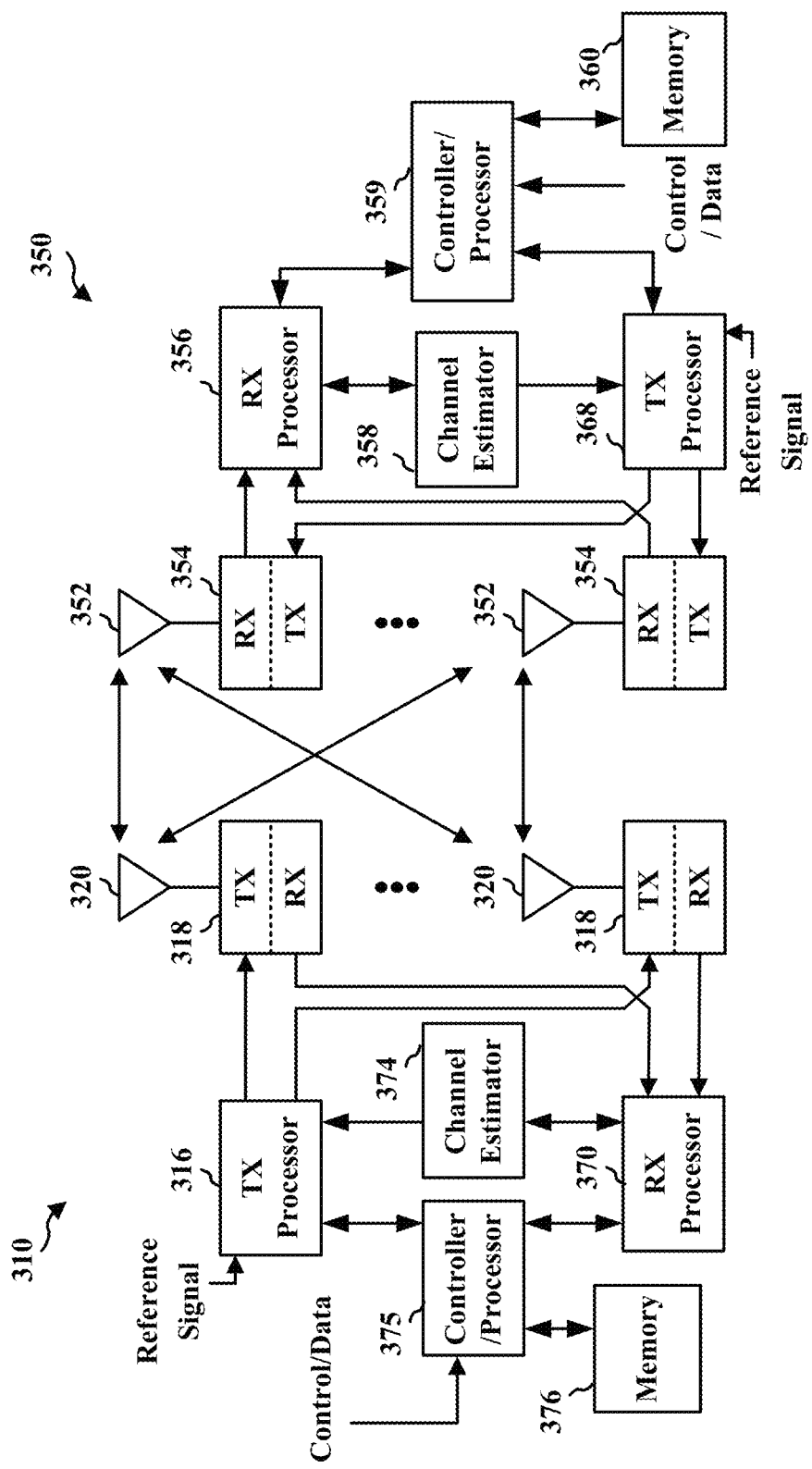
FIG. 3 is a diagram illustrating an example of a first wireless device and a second wireless device in an access network, in accordance with various aspects of the present disclosure.

FIG. 3 is a block diagram of a first wireless device in communication with a second wireless device. For example, the first wireless device 310 may be a base station in communication with a UE (e.g., the second wireless device 350) in an access network. In some examples, the first wireless device 310 may be an IAB node in communication with a UE (e.g., the second wireless device 350). In other examples, the first device 310 may be a parent IAB node (e.g., an IAB node DU) and the second wireless device 350 may be a child IAB node (e.g., an IAB node MT). In some examples, the first wireless device 310 may be an IAB donor, and the second wireless device 350 may be an IAB node. In some examples, the first wireless device may be an IAB donor, and the second wireless device may be an IAB donor.

Although the aspects in FIG. 3 are described in connection with a base station and a UE, the concepts are applicable to communication between other wireless devices. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the wireless device 310. These soft decisions may be based on channel estimates computed by the channel estimator 358. The soft decisions are then decoded and deinterleaved to recover the data and control signals that were originally transmitted by the wireless device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the wireless device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the wireless device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the wireless device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 and 199 of FIG. 1.

In an integrated access and backhaul (IAB) network, there are two types of BSs: IAB-donors and IAB-nodes. The IAB-donors include a central unit (CU) that controls the whole IAB network through configuration. The IAB-donors also include a distributed unit (DU) that schedules child nodes of the IAB-donor. The IAB-node is an L2 relay node that includes mobile termination (MT) and DU functions. The MT is scheduled (similar to a UE) by its parent IAB-node or IAB-donor. The DU schedules child nodes of the IAB-node. Routing packet traffic through the CU, the DU, and the MT over the IAB network may involve extensive mapping information and configuration of IP headers of the packet.

Figure 4:
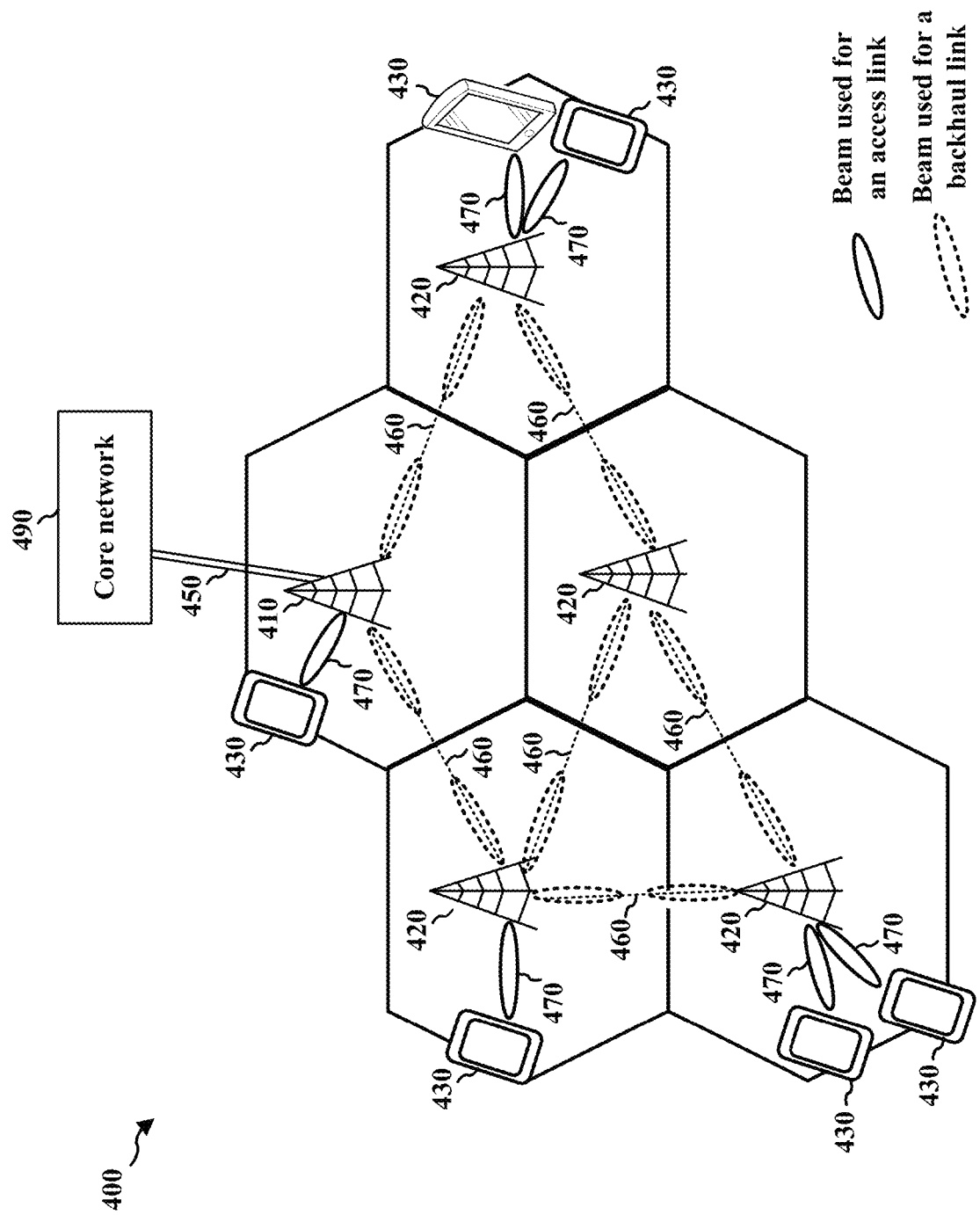
FIG. 4 is a diagram illustrating an example IAB network, in accordance with various aspects of the present disclosure.

FIG. 4 is a diagram illustrating an IAB network 400. The IAB network provides access network functionality between access nodes (ANs) 420 and other ANs/UEs, and backhaul network functionality between ANs 420. The ANs 420 include IAB-donors, which may have a wireline connection to the core network, and IAB-nodes, which operate wirelessly and relay traffic to/from IAB-donors through one or more AN hops. The IAB ANs 420 share resources between the access links and the backhaul links. That is, the resources (e.g., in time and frequency) that are used for access communication between the AN(s) 420 and other AN(s) 420 and/or between AN(s) 420 and UE(s) 430 may also be used for backhaul communication between the AN(s).

The IAB network 400 may include an anchor node (that may be referred to herein as an "IAB donor") 410 and access nodes (that may be referred to herein as "IAB nodes") 420. The IAB donor 410 may be a base station (e.g., 102 or 180 in FIG. 1) and may perform functions to control the IAB network 400. In some aspects, the IAB donor 410 may be an eNB or a gNB. The IAB nodes 420 may comprise L2 relay nodes, etc. Together, the IAB donor 410 and the IAB nodes 420 share resources to provide an access network and a backhaul network to core network 490. For example, resources may be shared between access links and backhaul links in the IAB network.

The UEs 430 interface with the IAB nodes 420 or the IAB donor 410 through access links 470. The IAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the IAB network 400 via backhaul links 460 to the TAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or TAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node.

Figure 5:
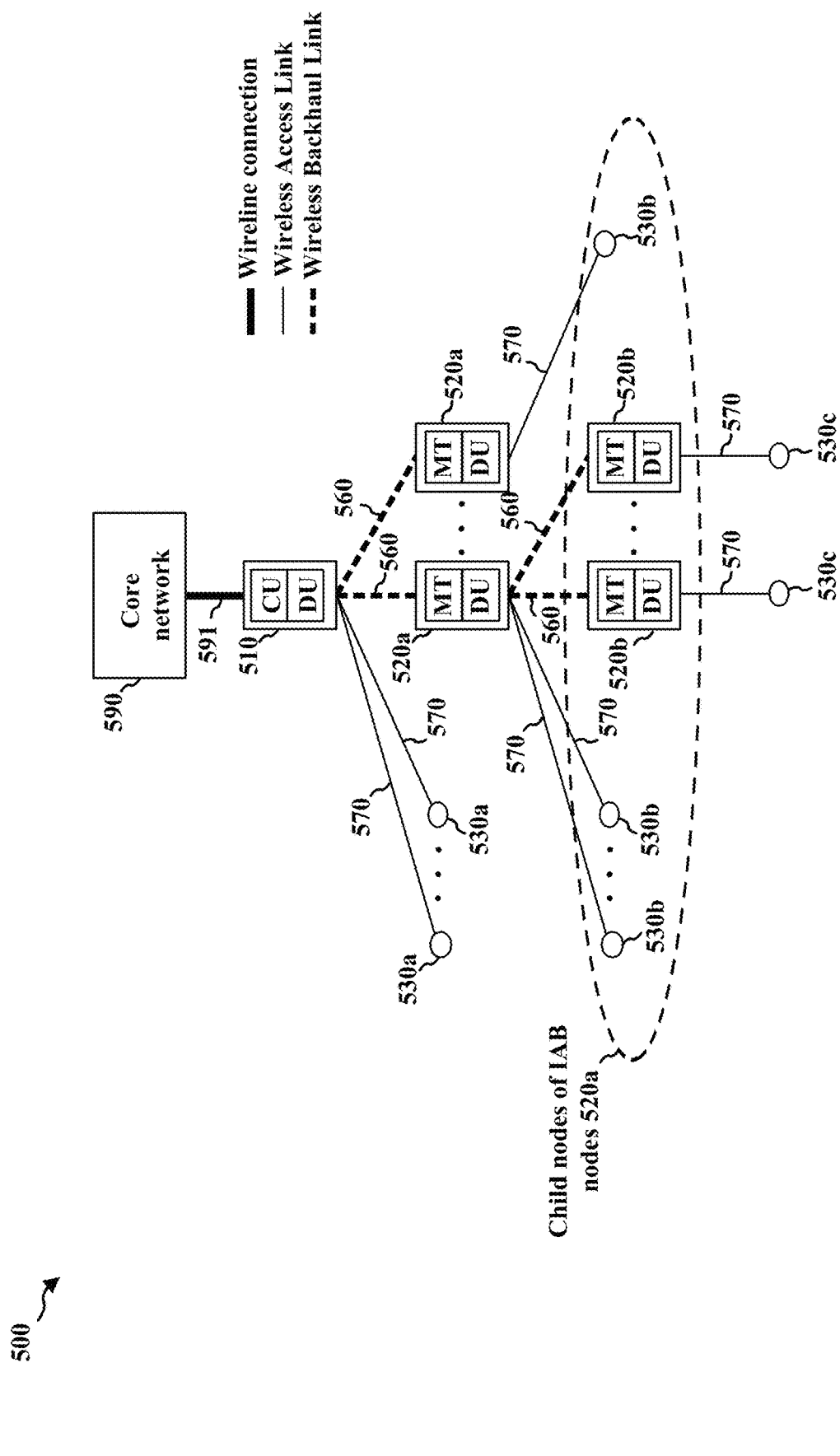
FIG. 5 is a diagram illustrating an example IAB network and components thereof, in accordance with various aspects of the present disclosure.

FIG. 5 illustrates a second diagram illustrating an IAB network 500 and components thereof. The IAB network 500 includes an IAB donor 510 and IAB nodes 520a and 520b. The IAB nodes, as well as the IAB donor, may provide wireless access links to UEs 530a, 530b, 530c.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, the IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may control the IAB network 500 through configuration. The CU may perform RRC/PDCP layer functions. The IAB donors 510 further include a DU that performs scheduling. For example, the DU may schedule resources for communication by the child IAB nodes 520a and/or UEs 530a of the IAB donor 510. The DU holds radio link control (RLC), media access control (MAC), a physical (PHY) layer functions.

The IAB nodes 520*a*, 520*b* may include a mobile termination (MT) and a DU. The IAB node is an L2 relay node. The MT of IAB node 520*a* may operate as a scheduled node, scheduled similar to a UE 530*a* by the DU of the parent node, e.g., IAB donor 510. The MT of IAB node 520*b* may operate as a scheduled node of parent node 520*a*. The DU may schedule the child IAB nodes 520*b* and UEs 530*b* of the IAB node 520*a*. An IAB node may provide a connection to an IAB node that in turn provides a connection for another IAB node. The pattern of a parent IAB node comprising a DU that schedules a child IAB node/child UE may continue to more connections than the connections illustrated in FIG. 5.

Figure 6:
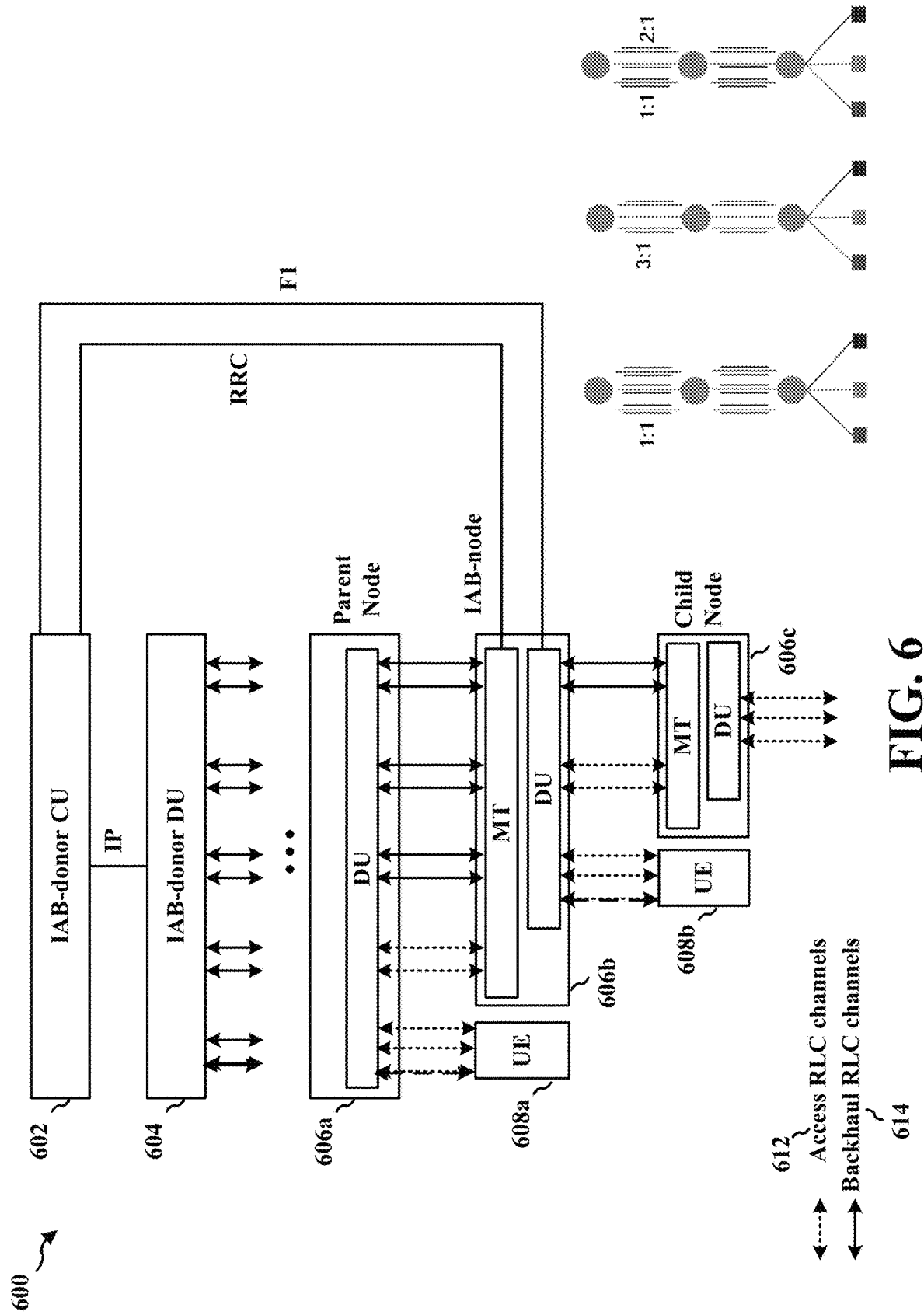
FIG. 6 is a diagram illustrating example connections for an IAB network, in accordance with various aspects of the present disclosure.

FIG. 6 is a diagram 600 illustrating RLC channels in an IAB network. As discussed in connection with FIGS. 4 and 5 the IAB network provides both access network functionality and backhaul network functionality. The IAB network includes an IAB donor with a CU 602 and DU 604. For the access network functionality, the IAB ANs 606*a*, 606*b*, and 606*c* may communicate with other UEs 608*a* and 608*b* and/or MTs of other IAB ANs through access RLC channels 612. Per. For the backhaul network functionality, the IAB ANs 606*a*, 606*b*, and 606*c* may route traffic to other ANs (e.g., 606*a*, 606*b*, and 606*c*) through backhaul RLC channels 614. Access RLC channels 612 may include UE-to-DU/DU-to-UE, carrying PDCP for RRC or data radio bearers (DRBs), and MT-to-DU/DU-to-MT, carrying PDCP for RRC (or DRBs). Backhaul RLC channels 614 may include MT-to-DU/DU-to-MT, carrying backhaul adaptation protocol (BAP) messages for backhauling access traffic.

Different possible mappings are allowed between UE/MT DRBs and backhaul RLC channels 604, such as illustrated with 1:1 UE DRBs to backhaul RLC channels 604 (i.e., each UE DRB mapped to one backhaul RLC channel), 3:1 UE DRBs to backhaul RLC channels 604 (i.e., three UE DRBs mapped to one backhaul RLC channel), and 1:1 UE DRBs to backhaul RLC channels 604 and 2:1 UE DRBs to backhaul RLC channels 604 (i.e., one UE DRB mapped to a first backhaul RLC channel and two UE DRBs mapped to a second backhaul RLC channel) mappings. The 1:1 mapping allows particular UE DRBs to be prioritized over others, whereas for the 2:1 and 3:1 mappings, UE DRBs in the same backhaul RLC channel may not be prioritized over each other.

Differentiated services may provide a framework and building blocks to enable deployment of scalable service discrimination on the Internet. In the packet forwarding path, differentiated services (DS) may be realized by mapping the differentiated services codepoint (DSCP) contained in a field in the Internet protocol (IP) packet header (e.g., including the fields illustrated in the example header information 700 in FIG. 7A) to a particular forwarding treatment, or per-hop behavior (PHB), at each AN along its path. Six bits of the DS field are used as the DSCP to select the PHB that a packet experiences at each node. The two-bit CU field may be reserved. The DSCP field may be defined as an unstructured field to facilitate the definition of future per-hop behaviors. The mapping of DSCPs to PHBs may be configurable. A DS-compliant node may support the logical equivalent of a configurable mapping table from DSCPs to PHBs.

An IP flow label field (referred to herein as IP flow label) may include a 20-bit flow label field in the IP header (e.g., an IPv6 header) that is used by an AN to label packets of a flow. From the viewpoint of the network layer, a flow is a sequence of packets sent from a particular source to a particular unicast, anycast, or multicast destination that an AN intends to label as a flow. An example definition of a flow for this purpose may be any set of packets carrying the same 5-tuple of {destination address, source address, protocol, destination port, source port}. There are cases in which the complete 5-tuple for all packets is not readily available to a forwarding AN, in particular for fragmented packets. In such cases, a flow can be defined by fewer IP header fields, typically using only the 2-tuple {destination address, source address}. The usage of the 3-tuple of the flow label, source address, and destination address fields enables efficient IP flow classification, where only IPv6 main header fields in fixed positions are used. Packets may be processed in a flow-specific manner. To enable flow-label-based classification, source nodes may assign each unrelated transport connection and application data stream to a new flow.

As illustrated in the example 725 in FIG. 7B, a UE 708 may be dual connected to a master node (MN) eNB 704 and a secondary gNB (an IAB-donor) 708 that manages IAB. For each requested E-UTRAN radio access bearer (E-RAB) configured as MN terminated split bearer/secondary cell group (SCG) bearer, if the QoS mapping information element (IE) is contained in the general packet radio service (GPRS) tunnelling protocol (GTP) tunnel endpoint IE in the secondary gNB (SgNB) additional/modification request acknowledge message, the master eNB (MeNB) 704 (also referred to as MN-eNB) shall, if supported, use the IE to set the DSCP and/or flow label fields for the downlink IP packets which are transmitted from the MeNB to a secondary node (SN) enhanced gNB (SN-en-gNB) 706 (serving the IAB) through the GTP tunnels indicated by the GTP tunnel endpoint IE. The SN donor 706 configures a mapping of the received packets from the MN-eNB 704 based on the IP header fields to a route via the IAB backhaul transport.

For each requested DRB, if the QoS mapping information IE is contained in the DL user plane (UP) parameters IE in the bearer contact setup/modification request message, the gNB CU for UP (gNB-CU-UP) shall use the IE to set the DSCP and/or flow label fields in the downlink IP packets that are transmitted through the GTP tunnels indicated by the UP transport layer information IE. A downlink mapping is configured at IAB-donor-DU based on the IP header fields to a BAP route and egress backhaul RLC channel.

A UE 708 may be connected to an IAB-network. FIG. 7C illustrates an example 750 of a UE 708 connected in an IAB-network. The IAB-donor may setup a DRB for the UE. The DRB flows between the IAB-donor-CU and the UE. In some aspects, the IAB-donor-CU may configure a downlink mapping at a donor-DU as previously described. In some aspects, the IAB-donor-CU may configure IP header fields with DSCP/IPv6 flow labels and may send packets to the donor-DU as previously described. In some aspects, the IAB-donor-CU may include the CU-CP 710 and one or more CU-UPs 712, as shown in FIG. 7C. In such aspects, a DRB flow between a CU-UP and the UE may be configured as previously described. The CU-CP may perform bearer setup per DRB at a CU-UP. The CU-CP may configure QoS mapping info at the CU-UP for each requested DRB as previously described. The CU-UP may also configure the IP header fields based on the QoS mapping info as previously described. The downlink mapping may be configured by the CU-CP at the donor-DU as previously described.

The IAB-donor CU may include an IAB-donor CU for the control plane (CP) (IAB-donor-CU-CP) 710 and one or more IAB-donor CUs for the user plane (UP) (IAB-donor- CU-UPs) 712. A DRB flows between an IAB-donor-CU-UP through an IAB-donor-DU or IAB-DU 714 to/from a UE 708. The IAB-donor-CU-UP 712 inserts within an IP packet QoS mapping information, which includes the DSCP and the IP flow label. Based on the QoS mapping information, the IAB-donor-CU-CP 710 configures a routing path for the IAB-donor-DU, so when the IAB-donor-DU receives an IP packet, the IAB-donor-DU decides how to route the traffic.

Figure 8:
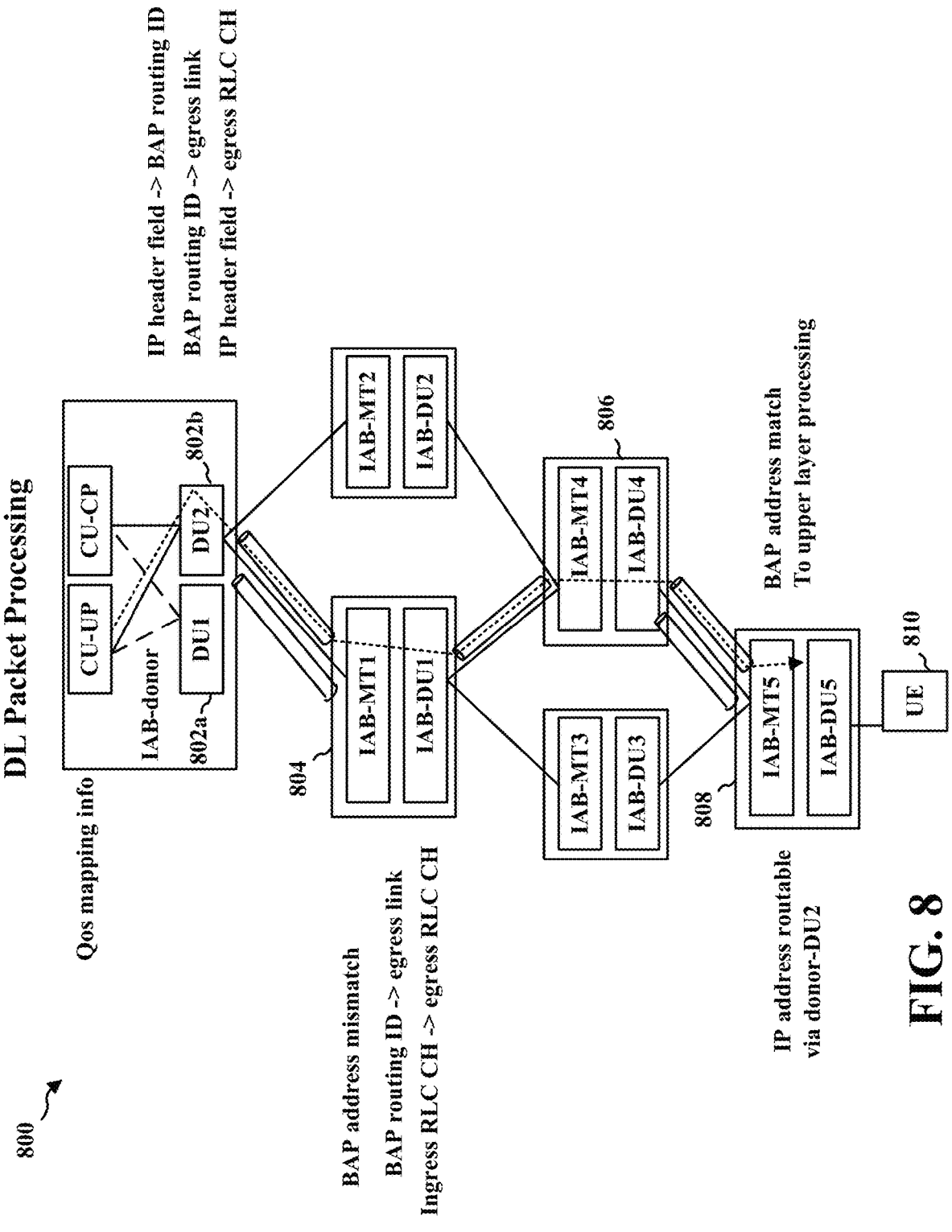
FIG. 8 illustrates an example of downlink packet processing in an IAB network, in accordance with various aspects of the present disclosure.

FIG. 8 is a diagram 800 illustrating an IP/BAP configuration for downlink packet processing. As discussed supra, the IAB-donor-CU (e.g., IAB-donor-CU-UP) (e.g., IAB donor 1 802*a* or IAB donor 2 802*b*) inserts within an IP packet QoS mapping information, which includes the DSCP and the IP flow label. Based on the QoS mapping information, the IAB-donor-CU (e.g., IAB-donor-CU-CP) configures a routing path for a downlink mapping at the IAB-donor-DU. When the IAB-donor-DU receives an IP packet, the IAB-donor-DU may then decide how to route the traffic based on the IP header and the downlink mapping configuration. The downlink mapping configuration indicates a mapping between the IP header fields (destination IP address, DCSP, and/or IPv6 flow label) and a BAP routing ID. The IAB-donor-DU inserts a BAP header to the packet that carries the BAP routing ID. The IAP-donor-DU further determines an egress link to which to forward the IP packet. For example, the IAP-donor-DU further determines, based on a routing configuration, a mapping between the BAP routing ID and an egress link along which the IAB-donor-DU forwards the BAP packet. The IAB-donor-DU transmits the BAP packet to the IAB-node 1 804. The IAB-node 1 804 determines that the BAP address, which may be part of the BAP routing ID and carried in the BAP header, does not match its own BAP address (i.e., there is a BAP address mismatch), and based on the BAP routing ID and a routing configuration, determines the egress link for transmitting the BAP packet. Based on the ingress RLC channel and a channel mapping configuration, the IAB-node 1 804 determines the egress RLC channel. The IAB-node 1 804 then transmits the IP packet through the determined link and the egress RLC channel to the IAB-node 4 806. The same process is followed for IAB-node 4 806 and IAB-node 5 808, where IAB-node 5 808 determines a BAP address match, removes the BAP header, and forwards the IP packet to upper layer processing for transmission to a UE 810.

Figure 9:
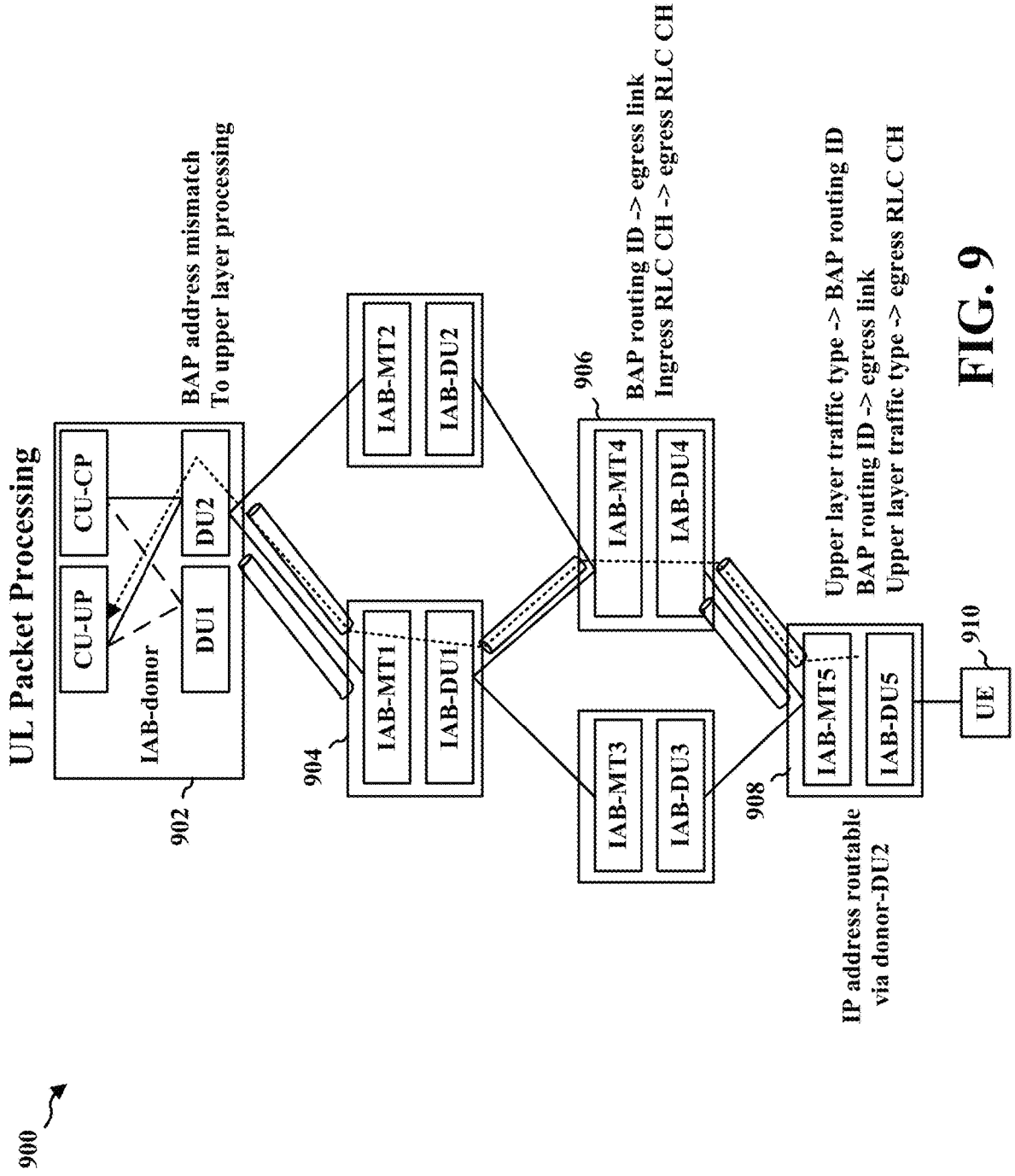
FIG. 9 illustrates an example of uplink packet processing, in accordance with various aspects of the present disclosure.

FIG. 9 is a diagram 900 illustrating an IP/BAP configuration for uplink packet processing. For UL traffic, based on the traffic type and an uplink mapping configuration, the IAB-node 5 908 determines a BAP routing ID for an uplink packet from the UE 910, and inserts the BAP routing ID into the BAP header for the UL packet. Based on the BAP routing ID and a routing configuration, the IAB-node 5 908 determines an egress link, and based on the traffic type, determines an egress RLC channel. The IAB-node 5 908 transmits the IP packet to the IAB-node 4 906 based on the determined egress link and egress RLC channel. The IAB-node 4 906 determines, based on the BAP routing ID and a routing configuration, the egress link. The IAB node 4 906 determines, based on the ingress RLC channel and a channel mapping configuration, the egress RLC channel. The IAB-node 4 906 transmits the BAP packet to the IAB-node 1 904 based on the determined egress link and egress RLC channel. The same process is followed by IAB-node 1 904, and the IP packet is ultimately received and processed by the IAB-donor 902 where there is a BAP address match.

Figure 10:
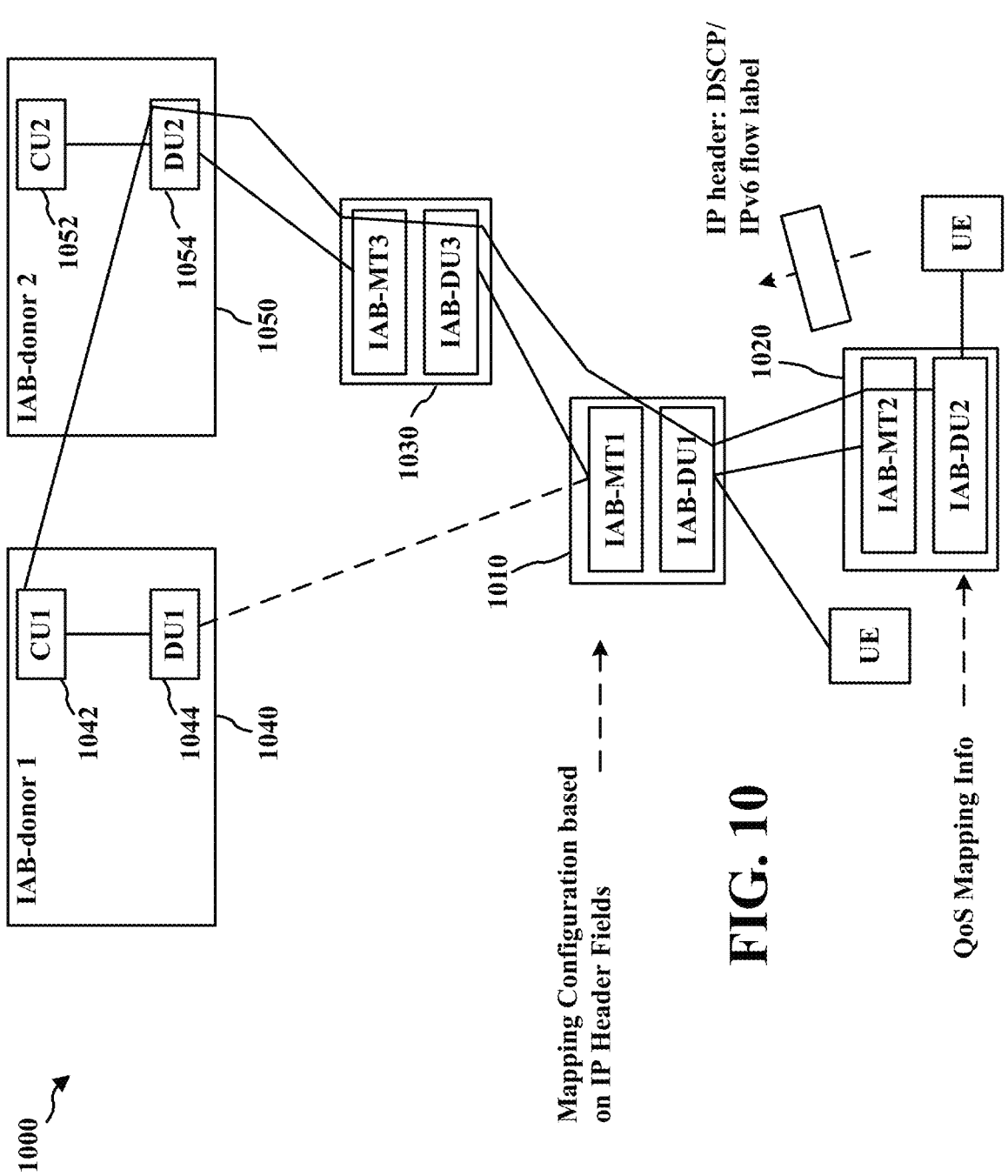
FIG. 10 is an example scenario illustrating an example of topological redundancy in an IP/BAP configuration, in accordance with various aspects of the present disclosure.

FIG. 10 illustrates an example topological redundancy diagram 1000 for IAB donors. An IAB-node may be connected to one or more IAB-donors. As illustrated in FIG. 10, IAB-MT1 of IAB-node 1 1010 may be dual-connected to CU1 1042 of IAB-donor 1 1040 and CU2 1052 of IAB-donor 2 1050. IAB-DU1 1040 may be connected to the CU2 1052 of the IAB-donor 2 1050. Children node of IAB-node 1 1010, such as IAB-node 2 1020 may be connected to CU1 1042 of IAB-donor 1 1040. IAB-node 3 1030 may be connected to the CU2 1052 of the IAB-donor 2 1050. The CU1 1042 of the IAB-donor 1 81040 may route F1-U traffic over a secondary path via a donor-DU 1054 associated with CU2 1052 of the IAB-donor 2 1050 to facilitate load-balancing or redundancy between the IAB-donors (e.g., between the DU1 1044 and the DU2 1054). The IAB-node 1 1040 may perform routing and channel mapping based on IP header information. Similarly, an MT1 may be single-connected to parent DU3 of the IAB node 1030 and CU2 801052 while IAB-node 1 1010 and/or the UEs are connected to the first donor 1040. For example, for topology adaptation, MT1 may migrate from the first donor to the second donor, where at least one of the UEs or child/descendant MTs is not yet migrated to the second donor. Thus, in this example, the backhaul routing path may extend over multiple topology sections managed by different CUs. For example, IAB-node 1 (1010) may perform routing and channel mapping based on IP header information. IAB-node 2 (1020) configures IP header information such as DSCP or IPv6 flow labels for upstream packets carried over the backhaul routing path via IAB-node 1. Further, similar scenario may be configured in topology adaptation. One example of the topology adaptation is when MT1 of IAB-node 1 (1010) is initially connected to the first donor and then migrates to the second donor by connecting to parent DU3 of IAB-node 3 (1030), while at least one of the UEs or child/descendant MTs is not yet migrated to the second donor.

Figure 11:
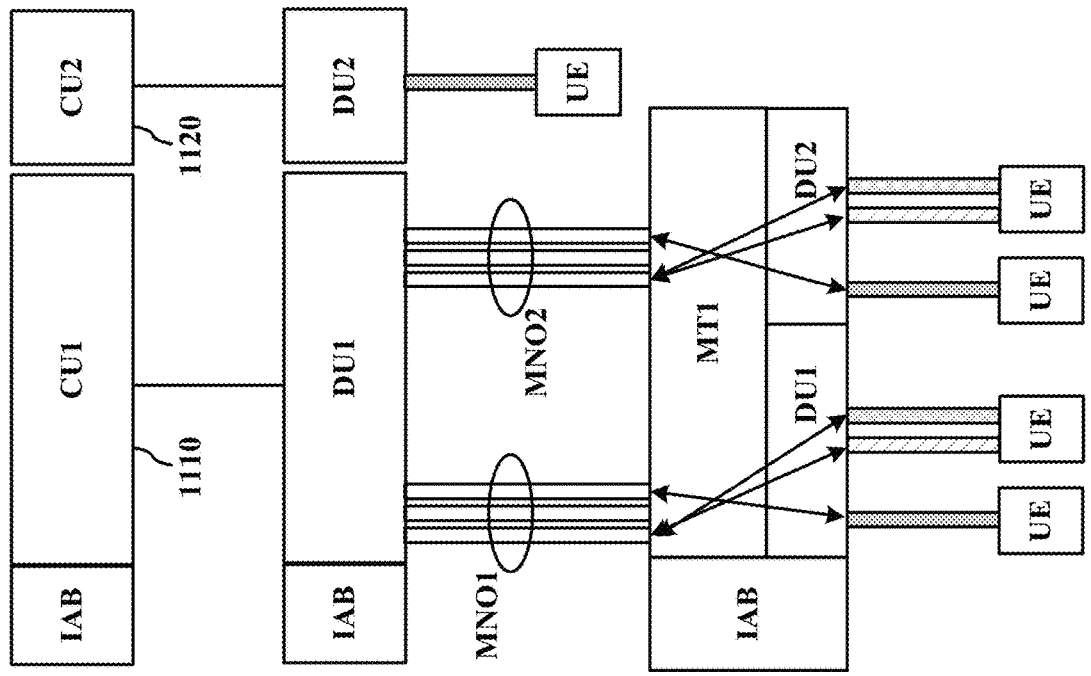
FIG. 11 is a diagram illustrating aspects of QoS support in an IAB radio access network (RAN) sharing environment, in accordance with various aspects of the present disclosure.

FIG. 11 is a diagram 1100 illustrating issues that may arise for QoS support in an IAB radio access network (RAN) sharing environment. In FIG. 11, the CU1 (1110) may be associated with a public land mobile network (PLMN). The CU2 (1120) may be associated with a non-public network (NPN). Thus, the NPN and the PLMN may share the same RAN resources, where the RAN supports the IAB and is managed by one of these networks (i.e., PLMN, NPN). In one aspect, the NPN may be associated with an enterprise, which offers employees access to its own network as well as to one (or multiple) PLMN(s). In another aspect, either the NPN's gNB-CU or the PLMN's gNB-CU may obtain IAB-donor functionality to control the IAB network operation. The respective other network may remain agnostic to the IAB and may use the wireless backhaul as a conventional layer-2 transport network. Therefore, in the IAB RAN sharing environment of FIG. 11, issues remain regarding the host network management of the backhaul transport for the client network(s) including QoS enforcement. For example, the CU2 (1120) may setup a DRB for a UE connected to logical DU2 of the bottom IAB-node. CU2 (1120) may indicate QoS information for the DRB. As the UE connected to the DU2 may be associated with the CU2 1120, the CU1 1110 may not be aware of the QoS information for the newly established DRB. However, the DRB-associated traffic is carried using the IAB backhaul transport that is managed by the CU1 1110. The CU1 1110 may then pre-configure backhaul routing paths (e.g. dedicated backhaul RLC channels) to carry CU2-associated DRBs, where the access IAB-node maps traffic to the routing paths/backhaul RLC channels based on IP header information. In FIG. 11, an IAB-node configures IP header information for upstream packets carried over the backhaul routing path, where the uplink mapping of the upstream packets by the IAB-node is based on the IP header information. The IAB-node may receive QoS mapping information (and configure the IP header fields per traffic type based on the received QoS mapping information) from the CU2 1120. The CU1 1110 may provide the uplink mapping to the IAB-node based on the IP header fields. A similar example may apply for the case in which the IAB RAN sharing is between multiple PLMNs or NPNs.

Figure 12:
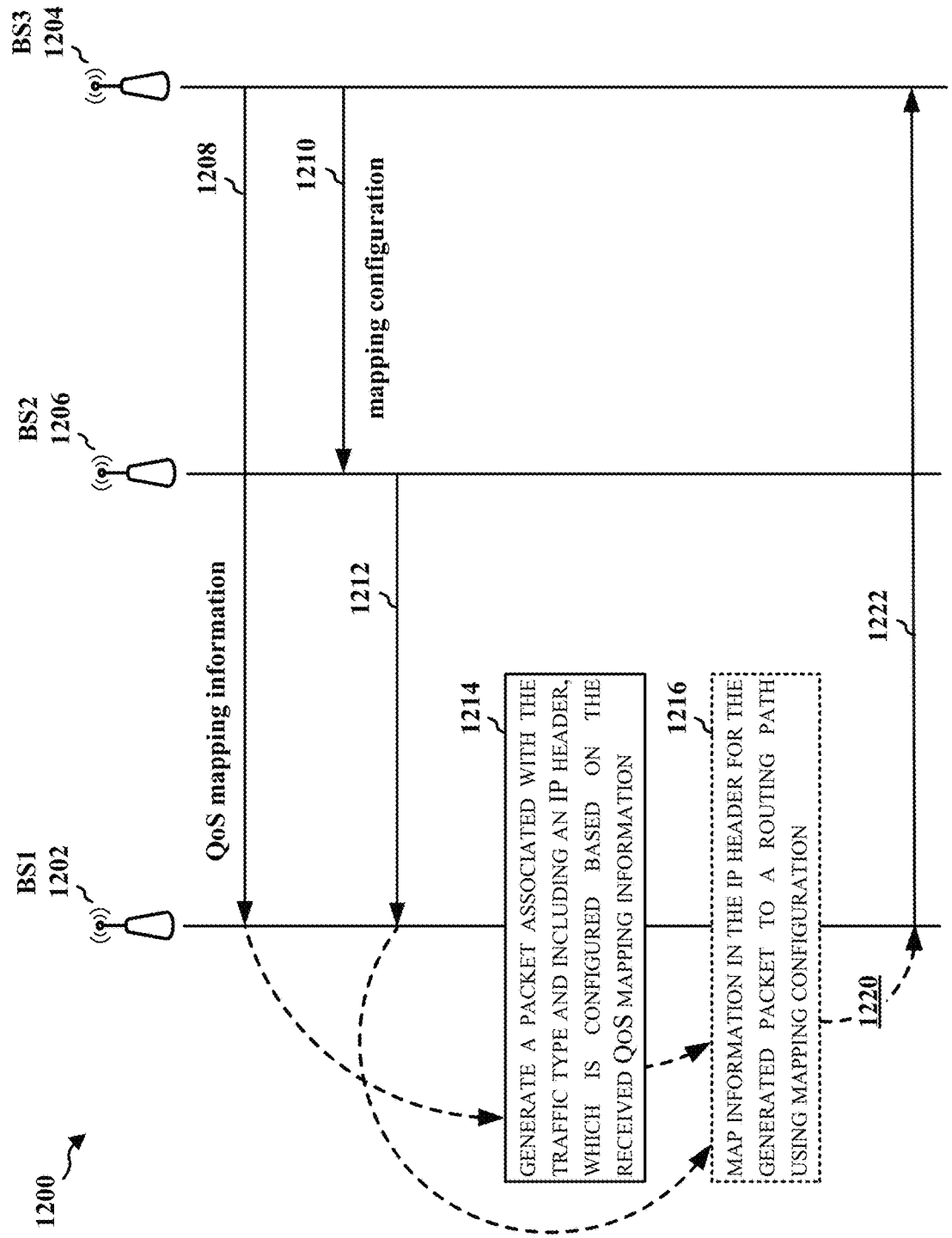
FIG. 12 illustrates an example communication flow among first network node, second network node, and third network node to configure QoS mapping of an IAB-node in accordance with certain aspects of the disclosure, in accordance with various aspects of the present disclosure.

FIG. 12 illustrates an example communication flow 1200 among first network node 1202, second network node 1206, and third network node 1204 to configure QoS mapping of an IAB-node in accordance with certain aspects of the disclosure. The network nodes may be referred to as an IAB node, a base station, a RAN node, or a relay node, in some aspects. In some aspects, any of the first network node 1202, the second network node 1206, or the third network node 1204 may be an IAB node or provide IAB node functionality. The first network node 1202 may correspond to a base station 102 or 180 or IAB node 103 in FIG. 1, the wireless device 310 in FIG. 3, or IAB-node 1020. The second network node 1206 may correspond to a base station 102 or 180 or IAB node 103 in FIG. 1, the wireless device 310 in FIG. 3, IAB-donor node 1040, IAB-node 1010, or IAB-node 1030. The third network node 1204 may correspond to a base station 102 or 180 or IAB node 103 in FIG. 1, the wireless device 310 in FIG. 3, or an IAB-donor node in FIG. 10 or 11.

In the illustrated example communication flow 1200 of FIG. 12, the third network node 1204 may send QoS mapping information 1208 to the first network node 1202 to configure an IP header for a packet based on a traffic type, and to transmit the packet. As discussed supra, the QoS mapping information 1208 may include at least one of a DSCP value or an IP flow label value. The traffic type may include at least one of F1 control plane (F1-C) signaling, F1 user plane (F1-U) tunnel, or non-F1 traffic. The QoS mapping information 1208 sent to the first network node 1202 may configure the first network node 1202 to configure the IP header to include at least one of a DSCP field corresponding to the DSCP value or an IP flow label field corresponding to the IP flow label value. The QoS mapping information 1208 may be sent to the first network node 1202 through one of RRC signaling or F1-C signaling.

The example communication flow 1200 of FIG. 12 also illustrates the third network node 1204 sending a mapping configuration 1210 to the second network node 1206 to map information in the IP header for the packet received in a first routing path from the first network node 1202 to a second routing path. As discussed supra, the mapping configuration 1210 may include a mapping to at least one of a BAP routing ID, a BAP path ID, a destination BAP address, a next-hop BAP address for a next-hop node of the second network node 1206, or an egress backhaul RLC channel to the next-hop node of the second network node 1206. The mapping configuration 1210 may configure the second network node 1206 to map information in the IP header based on a destination IP address for the packet. The packet may be encapsulated in a BAP packet.

In the illustrated example communication flow 1200 of FIG. 12, the first network node 1202 may receive the QoS mapping information 1208 from the third network node 1204 to configure the IP header for the packet based on the traffic type. The first network node 1202 may generate a packet 1220 associated with the traffic type and including an IP header, at 1214, which is configured based on the received QoS mapping information 1208. The packet 1220 may then be transmitted for routing to the second network node 1206, at 1222. The received QoS mapping information 1208 may include at least one of a DSCP value or an IP flow label value. The traffic type may include at least one of F1-C signaling, F1-U tunnel, or non-F1 traffic. The received QoS mapping information 1208 received from the third network node 1204 may configure the first network node 1202 to configure the IP header to include at least one of a DSCP field corresponding to the DSCP value or an IP flow label field corresponding to the IP flow label value. The received QoS mapping information 1208 may be received from the third network node 1204 through one of RRC signaling or F1-C signaling. The received QoS mapping information 1208 may configure the first network node 1202 to configure the IP header for at least one of received uplink traffic or received downlink traffic.

The example communication flow 1200 of FIG. 12 also illustrates receiving the mapping configuration 1212 from the second network node 1206 to map information in the IP header for the generated packet 1220 to a routing path, at 1216. The packet 1220 may then be transmitted for routing to the third network node 1204 based on the routing path, at 1222. As the second network node 1206 provides the mapping configuration to an IAB-node, the second network node 1206 may correspond to the CU1 1110 of FIG. 11. As the IAB-node receives the QoS mapping information from the third network node 1204, the third network node 1204 may correspond to the CU2 1120 of FIG. 11. As the CU1 1110 manages traffic transport for the CU2-associated traffic in FIG. 11, the first network node 1202 may use mapping configuration of the second network node 1206 (i.e., the CU1 1110) and send traffic with configured IP header fields to CU2 1120, e.g., the third network node 1204. The second network node 1206 may be an IAB donor node different than the third network node 1204. The received mapping configuration 1212 may be an uplink mapping configuration. The mapping configuration 1212 may be received from the second network node 1206 through one of RRC signaling or F1-C signaling. In one aspect, the packet 1220 is encapsulated in a BAP packet.

Figure 13:
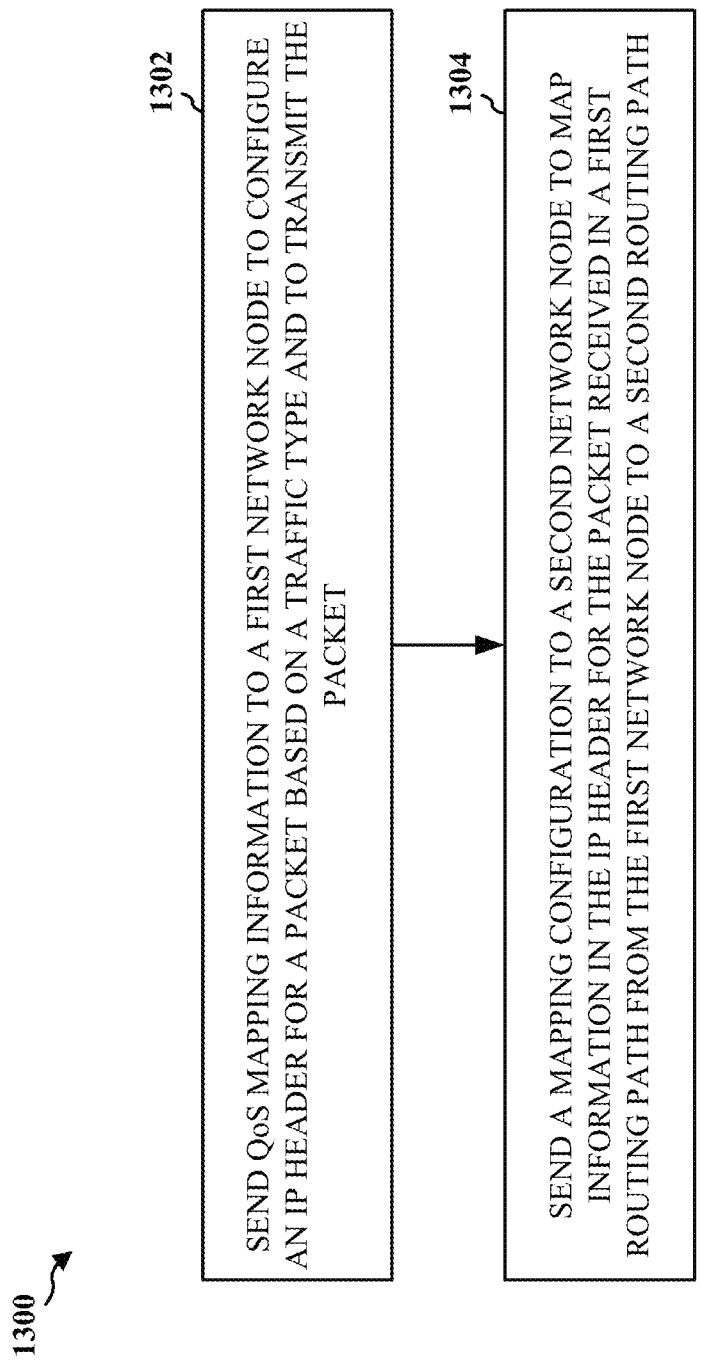
FIG. 13 is a flowchart of a method of wireless communication to configure QoS mapping of an IAB-node in accordance with certain aspects of the disclosure, in accordance with various aspects of the present disclosure.

FIG. 13 is a flowchart 1300 of a method of wireless communication to configure QoS mapping of an IAB-node in accordance with certain aspects of the disclosure. The method may be performed by a network node (e.g., a base station 102 or 180 or IAB node 103 in FIG. 1, the wireless device 310 in FIG. 3, IAB-donor node 1040 in FIG. 10, the network node 1204 in FIG. 12, or the apparatus 1402 in FIG. 14). The network node may be referred to as a RAN node or a relay node, in some aspects. In some aspects, the network node that performs the method may be referred to as a third network node, in communication with a first network node and a second network node. The first network node may correspond to a base station 102 or 180 in FIG. 1, the wireless device 310 in FIG. 3, or IAB-node 1020 in FIG. 10. The second network node may correspond to a base station 102 or 180 in FIG. 1, the wireless device 310 in FIG. 3, IAB-donor node, IAB-node, or IAB-node in any of FIGS. 8-11.

At 1302, the third network node may send QoS mapping information to the first network node to configure an IP header for a packet based on a traffic type, and to transmit the packet. As discussed supra, the QoS mapping information may include at least one of a DSCP value or an IP flow label value. The traffic type may include at least one of F1-C signaling, F1-U tunnel, or non-F1 traffic. The QoS mapping information may configure the first network node to configure the IP header to include at least one of a DSCP field corresponding to the DSCP value or an IP flow label field corresponding to the IP flow label value. The sent QoS mapping information may configure the first network node to configure the IP header for at least one of received uplink traffic or received downlink traffic. The QoS mapping information may be sent to the first network node through one of RRC signaling or F1-C signaling. In one example, 1302 may be performed by a mapping information component 1440 in FIG. 14. Further, FIG. 12 illustrates an example of the transmission of QoS mapping information 1208 from the third network node 1204 to the first network node 1202.

At 1304, the third network node may send a mapping configuration to the second network node to map information in the IP header for the packet received in a first routing path from the first network node to a second routing path. As discussed supra, the mapping configuration may include a mapping to at least one of a BAP routing ID, a BAP path ID, a destination BAP address, a next-hop BAP address for a next-hop node of the second network node, or an egress backhaul RLC channel to the next-hop node of the second network node. The mapping configuration may configure the second network node to map information in the IP header based on a destination IP address for the packet. The packet may be encapsulated in a BAP packet. In one example, 1302 may be performed by a mapping configuration component 1442 in FIG. 14. Further, FIG. 12 illustrates an example of the transmission of the mapping configuration 1210 from the third network node 1204 to the second network node 1206.

Figure 14:
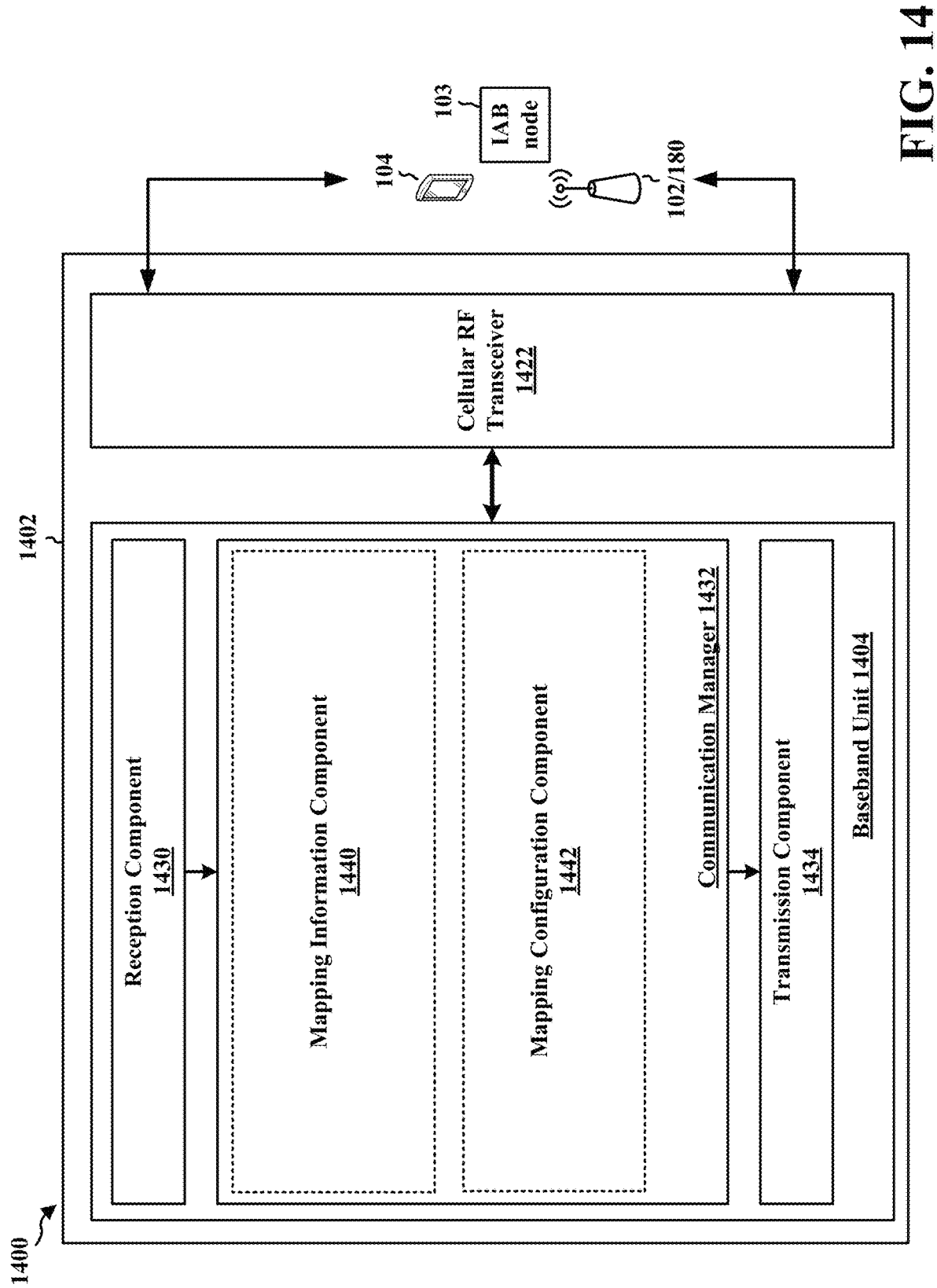
FIG. 14 is a diagram illustrating an example of a hardware implementation for an apparatus, in accordance with various aspects of the present disclosure.

FIG. 14 is a diagram 1400 illustrating an example of a hardware implementation for an apparatus 1402. The apparatus 1402 is a network node, a component of a network node, or provides network node functionality. The apparatus may be an IAB node, a component of an IAB node, or may implement IAB node functionality. The apparatus may be a base station, a component of a base station, or may implement base station functionality. In some aspects, the apparatus may be referred to as a RAN node or a relay node. In some aspects, the apparatus 1402 may be an IAB node, such as described connections with any of FIG. 1, 3, or 4-12. In some aspects, the apparatus may include a baseband unit 1404. The baseband unit 1404 may communicate through a cellular RF transceiver 1422 with the UE 104 or other base stations (BSs) 102/180, or IAB nodes 103 in an IAB network, e.g., such as the example IAB networks 400 or 500 shown in FIG. 4 or 5. As discussed supra, an IAB network may include IAB-donors and IAB-nodes. IAB-donors are an enhanced gNB with functions to control the IAB network. IAB-donors include a CU that controls the whole IAB network through configuration. The IAB-donors further include a DU that schedules child nodes (UEs and/or ANs) of the IAB-donor. The IAB-node is an L2 relay node that includes MT and DU functions. The MT is scheduled (similar to a UE) by its parent IAB-node or IAB-donor. The DU schedules child nodes (UEs and/or ANs) of the IAB-node.

The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the wireless device 310 and may include the memory 376 and/or at least one of the TX processor 316, the RX processor 370, and the controller/processor 375.

The communication manager 1432 includes a mapping information component 1440 that is configured to send QoS mapping information to the first BS to configure an IP header for a packet based on a traffic type, and to transmit the packet, e.g., as described in connection with 1302 in FIG. 13. The communication manager 1432 also includes a mapping configuration component 1442 that is configured to send a mapping configuration to the second BS to map information in the IP header for the packet received in a first routing path from the first BS to a second routing path, e.g., as described in connection with 1304 in FIG. 13.

The apparatus 1402 may include additional components that perform each of the blocks of the algorithm in the flowchart of FIG. 13, and/or the aspects performed by the third BS in FIG. 12. As such, each block in the flowcharts of FIG. 13 and/or the aspects performed by the third BS in FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes: means for sending QoS mapping information to a first BS to configure an IP header for a packet based on a traffic type and to transmit the packet; and means for sending a mapping configuration to a second BS to map information in the IP header for the packet received in a first routing path from the first BS to a second routing path. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 15:
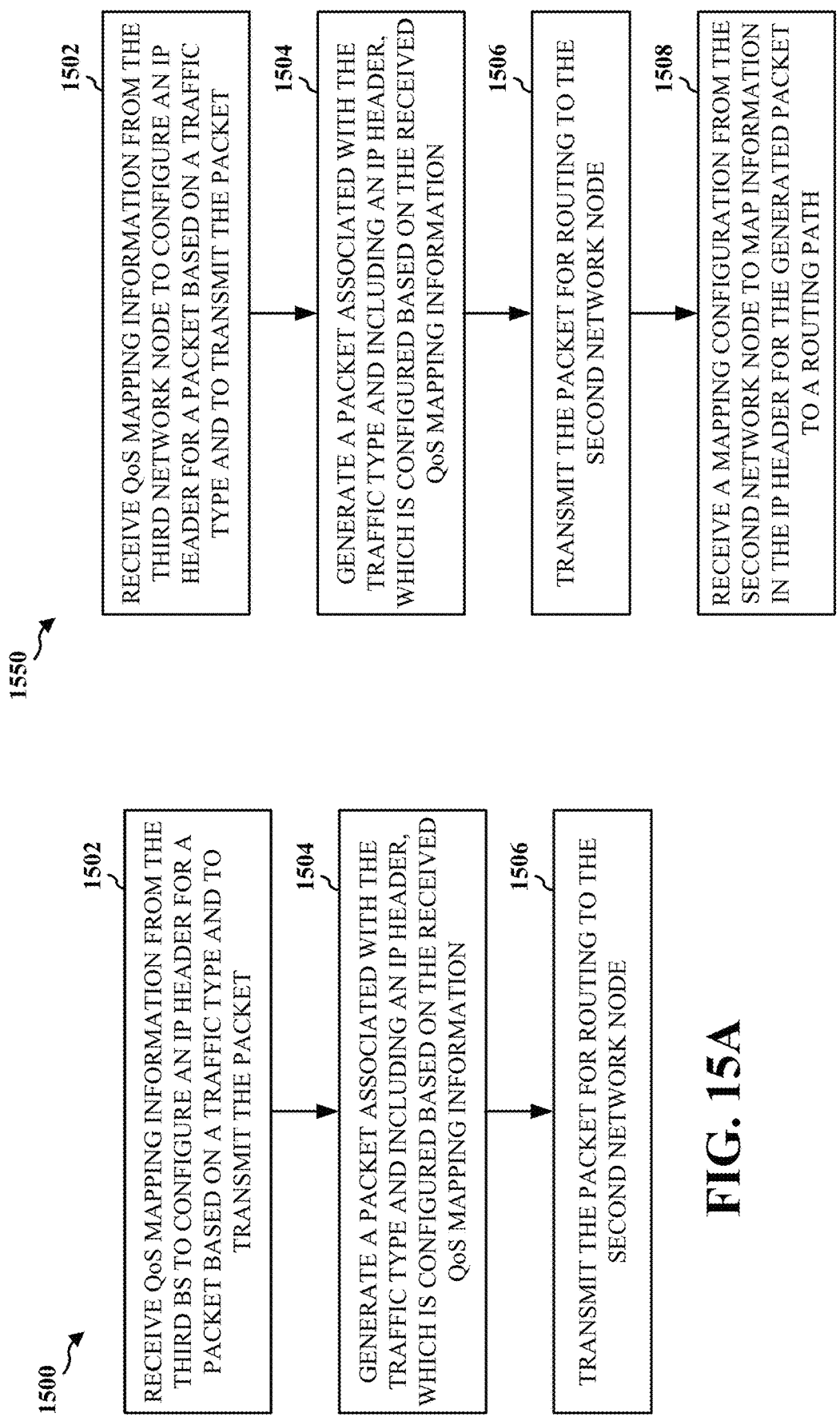
FIGS. 15A and 15B are flowcharts of methods of wireless communication to configure QoS mapping of an IAB-node in accordance with certain aspects of the disclosure, in accordance with various aspects of the present disclosure.

FIG. 15A is a flowchart 1500 of a method of wireless communication to configure QoS mapping of an IAB-node in accordance with certain aspects of the disclosure. The method may be performed by a first network node (e.g., a base station 102 or 180 or IAB node 103 in FIG. 1, the wireless device 310 in FIG. 3, IAB-donor node 1020 in FIG. 10, the network node 1202 in FIG. 12, or the apparatus 1602 in FIG. 16). The second network node may correspond to a base station 102 or 180 in FIG. 1, the wireless device 310 in FIG. 3, IAB-donor node 1004, IAB-node 1010, or IAB-node 1030 in FIG. 10. The third network node may correspond to a base station 102 or 180 in FIG. 1, the wireless device 310 in FIG. 3, or network node 1204 in FIG. 12.

At 1502, the first network node receives QoS mapping information from the third network node to configure an IP header for a packet based on a traffic type. The received QoS mapping information may include at least one of a DSCP value or an IP flow label value. The traffic type may include at least one of F1-C signaling, F1-U tunnel, or non-F1 traffic. The received QoS mapping information received from the third network node may configure the first network node to configure the IP header to include at least one of a DSCP field corresponding to the DSCP value or an IP flow label field corresponding to the IP flow label value. The received QoS mapping information may be received from the third network node through one of RRC signaling or F1-C signaling. The received QoS mapping information may configure the first network node to configure the IP header for at least one of received uplink traffic or received downlink traffic. In one example, 1502 may be performed by a mapping information component 1640 in FIG. 16. Further, FIG. 12 illustrates an example of the reception of the QoS mapping information 1208 at the first network node 1202.

At 1504, the first network node may generate a packet associated with the traffic type and including an IP header, which is configured based on the received QoS mapping information. The generated packet may be encapsulated in a BAP packet. In one example, 1504 may be performed by a packet generation component 1642 in FIG. 16. Further, FIG. 12 illustrates the generation of the packet at 1214.

At 1506, the packet may then be transmitted for routing to the second network node. In one example, 1506 may be performed by a packet transmission component 1644 in FIG. 16. Further, FIG. 12 illustrates the transmission of the packet 1220 to a routing path 1222.

FIG. 15B is a flowchart 1550 of a method of wireless communication to configure QoS mapping of an IAB-node in accordance with certain aspects of the disclosure. The method in FIG. 15B may include 1502, 1504, and 1506 as described in connection with FIG. 15A. As illustrated at 1508, the UE may receive a mapping configuration from the second network node to map information in the IP header for the generated packet to a routing path. The packet may be transmitted for routing to the second network node based on the routing path. The second network node may be an IAB donor node different than the third network node. The received mapping configuration may be an uplink mapping configuration. The mapping configuration may be received from the second network node through one of RRC signaling or F1-C signaling. In one example, 1506 may be performed by a mapping configuration component 1646 in FIG. 16. Further, FIG. 12 illustrates the reception of the mapping configuration 1212 from the second network node, mapping of the information in the IP header for the generated packet 1216, and transmitting the packet 1220 to the routing path 1222.

Figure 16:
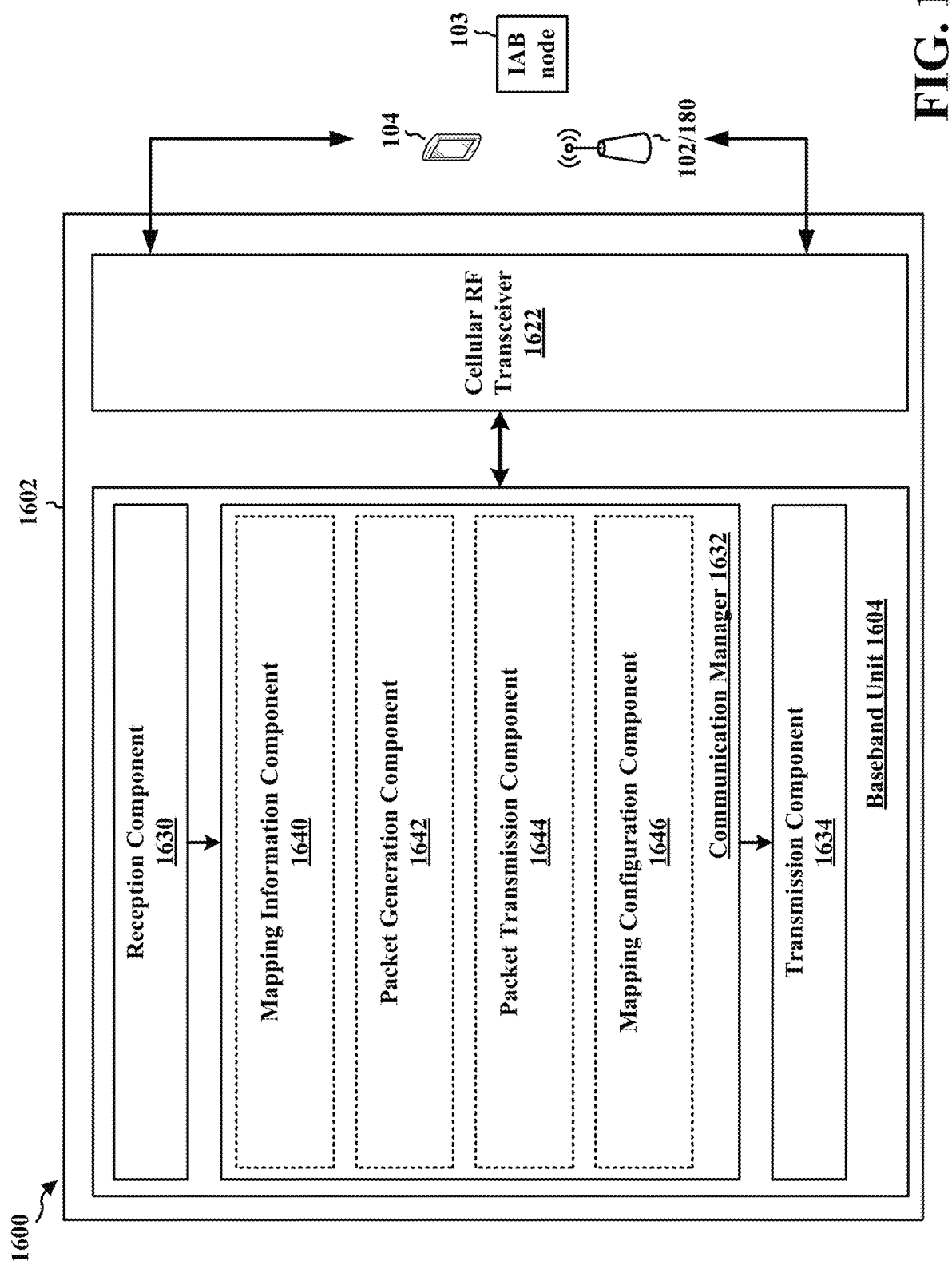
FIG. 16 is a diagram illustrating an example of a hardware implementation for an apparatus, in accordance with various aspects of the present disclosure.

FIG. 16 is a diagram 1600 illustrating an example of a hardware implementation for an apparatus 1602. The apparatus 1602 is a network node and or provides network functionality. The apparatus 1602 may be an IAB node, a component of an IAB node, or may implement IAB node functionality. The apparatus may be a base station, a component of a base station, or may implement base station functionality. In some aspects, the apparatus may be referred to as a RAN node or a relay node. In some aspects, the apparatus 1402 may be an IAB node, such as described connections with any of FIG. 1, 3, or 4-12. In some aspects, the apparatus may include a baseband unit 1604. The baseband unit 1604 may communicate through a cellular RF transceiver 1622 with the UE 104 or other base stations (BSs) 102/180, or IAB nodes 103 in an IAB network, such as the example IAB networks 400 or 500 shown in FIG. 4 or 5. As discussed supra, an IAB network may include IAB-donors and IAB-nodes. IAB-donors are an enhanced gNB with functions to control the IAB network. IAB-donors include a CU that controls the whole IAB network through configuration. The IAB-donors further include a DU that schedules child nodes (UEs and/or ANs) of the IAB-donor. The IAB-node is an L2 relay node that includes MT and DU functions. The MT is scheduled (similar to a UE) by its parent IAB-node or IAB-donor. The DU schedules child nodes (UEs and/or ANs) of the IAB-node.

The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the wireless device 310 and may include the memory 376 and/or at least one of the TX processor 316, the RX processor 370, and the controller/processor 375.

The communication manager 1632 includes a mapping information component 1640 that is configured to receive QoS mapping information from the third network node to configure an IP header for a packet based on a traffic type, e.g., as described in connection with 1502 in FIG. 15A or 15B. The communication manager 1632 also includes a packet generation component 1642 that is configured to generate a packet associated with the traffic type and including an IP header, which is configured based on the received QoS mapping information, e.g., as described in connection with 1504 in FIG. 15A or 15B. The communication manager 1632 also includes a packet transmission component 1644 that is configured to transmit the packet for routing to the second network node, e.g., as described in connection with 1506 in FIG. 15A or 15B. The communication manager 1632 further includes a mapping configuration component 1646 that is configured to receive a mapping configuration from the second network node to map information in the IP header for the generated packet to a routing path, e.g., as described in connection with 1508 in FIG. 15B.

The apparatus 1602 may include additional components that perform each of the blocks of the algorithm in the flowcharts of FIG. 15A or 15B. As such, each block in the flowcharts of FIG. 15A or 15B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for receiving QoS mapping information from a third network node to configure an IP header for a packet based on a traffic type and to transmit the packet; means for generating a packet associated with the traffic type and including an IP header, the IP header being configured based on the received QoS mapping information; and means for transmitting the packet for routing to a second network node. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

In an IAB network, routing packet traffic through the CU, the DU, and the MT may involve extensive mapping information and configuration of IP headers of the packet. In one aspect, QoS mapping information is sent from a third network node to a first network node to configure an IP header for a packet based on a traffic type. The third network node may also send a mapping configuration to the second network node to map information in the IP header for the packet received in a first routing path from the first network node to a second routing path. In another aspect, the first network node receives the QoS mapping information from the third network node to configure the IP header for the packet based on the traffic type. The first network node may generate a packet associated with the traffic type and including an IP header, which is configured based on the received QoS mapping information. The packet may then be transmitted for routing to the second network node.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

Aspect 1 is a method of wireless communication of a third network node, comprising: sending QoS mapping information to a first network node to configure an IP header for a packet based on a traffic type and to transmit the packet; and sending a mapping configuration to a second network node to map information in the IP header for the packet received in a first routing path from the first network node to a second routing path.

In aspect 2, the method of aspect 1 further includes that the QoS mapping information comprises at least one of a DSCP value or an IP flow label value, and the sent QoS mapping information configures the first network node to configure the IP header to include at least one of a DSCP field corresponding to the DSCP value or an IP flow label field corresponding to the IP flow label value.

In aspect 3, the method of any of aspects 1-2 further includes that the traffic type comprises at least one of F1-C signaling, F1-U tunnel, or non-F1 traffic.

In aspect 4, the method of any of aspects 1-3 further includes that the QoS mapping information is sent to the first network node through one of RRC signaling or F1-C signaling.

In aspect 5, the method of any of aspects 1-4 further includes that the sent QoS mapping information configures the first network node to configure the IP header for at least one of received uplink traffic or received downlink traffic.

In aspect 6, the method of any of aspects 1-5 further includes that the first network node is an IAB node.

In aspect 7, the method of any of aspects 1-6 further includes that the second network node is an IAB node.

In aspect 8, the method of any of aspects 1-6 further includes that the second network node is an IAB donor node.

In aspect 9, the method of any of aspects 1-8 further includes that the mapping configuration comprises a mapping to at least one of a BAP routing ID, a BAP path ID, a destination BAP address, a next-hop BAP address for a next-hop node of the second network node, or an egress backhaul RLC channel to the next-hop node of the second network node.

In aspect 10, the method of any of aspects 1-9 further includes that the mapping configuration configures the second network node to map information in the IP header based on a destination IP address for the packet.

In aspect 11, the method of any of aspects 1-10 further includes that the packet is encapsulated in a BAP packet.

Aspect 12 is an apparatus for wireless communication at a third network node, comprising: means for sending QoS mapping information to a first network node to configure an IP header for a packet based on a traffic type and to transmit the packet; and means for sending a mapping configuration to a second network node to map information in the IP header for the packet received in a first routing path from the first network node to a second routing path.

In aspect 13, the apparatus of aspect 12 further includes means to perform the method of any of aspects 2-11.

In aspect 14, the apparatus of aspect 12 or aspect 13 further includes at least one of an antenna or a transceiver.

Aspect 15 is an apparatus for wireless communication at a third network node, comprising: a memory; and at least one processor coupled to the memory and configured to perform the method of any of aspects 1-11.

In aspect 16, the apparatus of aspect 15 further includes at least one of an antenna or a transceiver.

Aspect 17 is a computer-readable medium storing computer executable code for wireless communication at a third network node, the code when executed by a processor causes the processor to perform the method of any of aspects 1-11.

Aspect 18 is a method of wireless communication of a first network node, comprising: receiving QoS mapping information from a third network node to configure an IP header for a packet based on a traffic type and to transmit the packet; generating a packet associated with the traffic type and including an IP header, the IP header being configured based on the received QoS mapping information; and transmitting the packet for routing to a second network node.

In aspect 19, the method of aspect 18 further includes that the QoS mapping information comprises at least one of a DSCP value or an IP flow label value, and the IP header is configured to include at least one of a DSCP field corresponding to the DSCP value or an IP flow label field corresponding to the IP flow label value.

In aspect 20, the method of any of aspects 18-19 further includes that the traffic type comprises at least one of F1-C signaling, F1-U tunnel, or non-F1 traffic.

In aspect 21, the method of any of aspects 18-10 further includes that the QoS mapping information is received from the third network node through one of RRC signaling or F1-C signaling.

In aspect 22, the method of any of aspects 18-21 further includes that the received traffic is at least one of uplink traffic or downlink traffic. wherein received QoS mapping information configures the first network node to configure the IP header for at least one of received uplink traffic or received downlink traffic.

In aspect 23, the method of any of aspects 18-22 further includes that the first network node is an IAB node.

In aspect 24, the method of any of aspects 18-23 further includes that the second network node is an IAB node.

In aspect 25, the method of any of aspects 18-23 further includes that the second network node is an IAB donor node.

In aspect 26, the method of any of aspects 18-25 further includes receiving a mapping configuration from the second network node to map information in the IP header for the generated packet to a routing path, wherein the packet is transmitted for routing to the second network node based on the routing path.

In aspect 27, the method of any of aspects 18-26 further includes that the second network node is an IAB donor node different than the third network node.

In aspect 28, the method of any of aspects 18-27 further includes that the mapping configuration is an uplink mapping configuration.

In aspect 29, the method of any of aspects 18-28 further includes that the mapping configuration is received from the second network node through one of RRC signaling or F1-C signaling.

In aspect 30, the method of any of aspects 18-29 further includes that the packet is encapsulated in a BAP packet.

Aspect 31 is an apparatus for wireless communication at a first network node, comprising: means for receiving QoS mapping information from a third network node to configure an IP header for a packet based on a traffic type and to transmit the packet; means for generating a packet associated with the traffic type and including an IP header, the IP header being configured based on the received QoS mapping information; and means for transmitting the packet for routing to a second network node.

In aspect 32, the apparatus of aspect 31 further includes means to perform the method of any of aspects 19-30.

In aspect 33, the apparatus of aspect 31 or aspect 32 further includes at least one of an antenna or a transceiver.

Aspect 34 is an apparatus for wireless communication at a first network node, comprising: a memory; and at least one processor coupled to the memory and configured to perform the method of any of aspects 18-30.

In aspect 35, the apparatus of aspect 34 further includes at least one of an antenna or a transceiver.

Aspect 36 is a non-transitory computer-readable medium storing computer executable code for wireless communication at a first network node, the code when executed by a processor causes the processor to perform the method of any of aspects 18-30.

What is claimed is:

1. An apparatus for wireless communication at a third network node, comprising:
    memory; and
    at least one processor coupled to the memory and configured to:
        send, from the third network node, quality of service (QOS) mapping information to a first network node, wherein the QoS mapping information indicates for the first network node to configure an Internet protocol (IP) header for a packet for transmission based on a traffic type; and
        send, from the third network node, a mapping configuration to a second network node to map information in the IP header for the packet received in a first routing path from the first network node to a second routing path.

2. The apparatus of claim 1, wherein the QoS mapping information comprises at least one of a differentiated service codepoint (DSCP) value or an IP flow label value, and sent QoS mapping information configures the first network node to configure the IP header to include at least one of a DSCP field corresponding to the DSCP value or an IP flow label field corresponding to the IP flow label value.

3. The apparatus of claim 1, wherein the traffic type comprises at least one of F1 control plane (F1-C) signaling, F1 user plane (F1-U) tunnel, or non-F1 traffic.

4. The apparatus of claim 1, wherein the QoS mapping information is sent to the first network node through one of radio resource control (RRC) signaling or F1 control plane (F1-C) signaling.

5. The apparatus of claim 1, wherein sent QoS mapping information configures the first network node to configure the IP header for at least one of received uplink traffic or received downlink traffic.

6. The apparatus of claim 1, wherein the first network node is an integrated access backhaul (IAB) node.

7. The apparatus of claim 1, wherein the second network node is an IAB node.

8. The apparatus of claim 1, wherein the second network node is an IAB donor node.

9. The apparatus of claim 1, wherein the mapping configuration comprises a mapping to at least one of a backhaul adaptation protocol (BAP) routing identifier (ID), a BAP path ID, a destination BAP address, a next-hop BAP address for a next-hop node of the second network node, or an egress backhaul radio link control (RLC) channel to the next-hop node of the second network node.

10. The apparatus of claim 1, wherein the mapping configuration configures the second network node to map the information in the IP header based on a destination IP address for the packet.

11. The apparatus of claim 1, wherein the packet is encapsulated in a BAP packet.

12. The apparatus of claim 1, further comprising at least one of an antenna or a transceiver.

13. A method of wireless communication of a third network node, comprising:
sending, from the third network node, quality of service (QOS) mapping information to a first network node, wherein the QoS mapping information indicates for the first network node to configure an Internet protocol (IP) header for a packet for transmission based on a traffic type; and
sending, from the third network node, a mapping configuration to a second network node to map information in the IP header for the packet received in a first routing path from the first network node to a second routing path.

14. The method of claim 13, wherein the QoS mapping information comprises at least one of a differentiated service codepoint (DSCP) value or an IP flow label value, and the QOS mapping information configures the first network node to configure the IP header to include at least one of a DSCP field corresponding to the DSCP value or an IP flow label field corresponding to the IP flow label value.

15. The method of claim 13, wherein the traffic type comprises at least one of F1 control plane (F1-C) signaling, F1 user plane (F1-U) tunnel, or non-F1 traffic.

16. An apparatus for wireless communication at a first network node, comprising:
memory; and
at least one processor coupled to the memory and configured to:
receive quality of service (QOS) mapping information from a third network node, wherein the QoS mapping information indicates for the first network node to configure an Internet protocol (IP) header for a packet for transmission based on a traffic type;
generate the packet associated with the traffic type and including an IP header, the IP header being configured based on the QOS mapping information; and
transmit the packet for routing to a second network node.

17. The apparatus of claim 16, wherein the QoS mapping information comprises at least one of a differentiated service codepoint (DSCP) value or an IP flow label value, and the IP header is configured to include at least one of a DSCP field corresponding to the DSCP value or an IP flow label field corresponding to the IP flow label value.

18. The apparatus of claim 16, wherein the traffic type comprises at least one of F1 control plane (F1-C) signaling, F1 user plane (F1-U) tunnel, or non-F1 traffic.

19. The apparatus of claim 16, wherein the QoS mapping information is from the third network node through one of radio resource control (RRC) signaling or F1 control plane (F1-C) signaling.

20. The apparatus of claim 16, where received traffic is at least one of uplink traffic or downlink traffic, wherein received QOS mapping information configures the first network node to configure the IP header for at least one of the uplink traffic or the downlink traffic.

21. The apparatus of claim 16, wherein the first network node is an integrated access backhaul (IAB) node.

22. The apparatus of claim 16, wherein the second network node is an integrated access backhaul (IAB) node.

23. The apparatus of claim 16, wherein the second network node is an integrated access backhaul (IAB) donor node.

24. The apparatus of claim 16, wherein the memory and the at least one processor are further configured to receive a mapping configuration from the second network node to map information in the IP header for the generated packet to a routing path, wherein the packet is transmitted for the routing to the second network node based on the routing path.

25. The apparatus of claim 24, wherein the second network node is an integrated access backhaul (IAB) donor node different than the third network node.

26. The apparatus of claim 24, wherein the mapping configuration is an uplink mapping configuration.

27. The apparatus of claim 24, wherein the mapping configuration is from the second network node through one of radio resource control (RRC) signaling or F1 control plane (F1-C) signaling.

28. The apparatus of claim 16, wherein the packet is encapsulated in a backhaul adaptation protocol (BAP) packet.

29. The apparatus of claim 16, further comprising at least one of an antenna or a transceiver.

30. A method of wireless communication of a first network node, comprising:
receiving quality of service (QOS) mapping information from a third network node, wherein the QoS mapping information indicates for the first network node to configure an Internet protocol (IP) header for a packet for transmission based on a traffic type;
generating the packet associated with the traffic type and including an IP header, the IP header being configured based on the QoS mapping information; and
transmitting the packet for routing to a second network node.

* * * * *